(12) United States Patent
Kataoka

(10) Patent No.: US 6,760,730 B1
(45) Date of Patent: Jul. 6, 2004

(54) RECEIVING DEVICE

(75) Inventor: Mitsuteru Kataoka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 260 days.

(21) Appl. No.: 09/694,961

(22) Filed: Oct. 24, 2000

(30) Foreign Application Priority Data

Oct. 29, 1999 (JP) .......................................... 11-310431

(51) Int. Cl.$^7$ ............................................ G06F 17/00
(52) U.S. Cl. ........................ 707/101; 707/10; 707/100
(58) Field of Search ........................ 707/1–10, 100–101, 707/104.1; 709/200–203

(56) References Cited

U.S. PATENT DOCUMENTS

| | | | | |
|---|---|---|---|---|
| 5,226,141 A | * | 7/1993 | Esbensen ..................... | 711/171 |
| 5,926,834 A | | 7/1999 | Carlson et al. | |
| 5,999,934 A | * | 12/1999 | Cohen et al. .................. | 104/46 |
| 6,092,080 A | * | 7/2000 | Gustman ................ | 707/103 R |
| 6,289,464 B1 | * | 9/2001 | Wecker et al. .............. | 713/300 |

FOREIGN PATENT DOCUMENTS

| | | |
|---|---|---|
| EP | 544172 | 6/1993 |
| EP | 597262 | 5/1994 |
| EP | 680152 | 11/1995 |
| WO | WO99/18730 | 4/1999 |
| WO | WO99/41668 | 8/1999 |

OTHER PUBLICATIONS

European Search Report dated Aug. 2, 2002, Application No. EP00122299.

* cited by examiner

*Primary Examiner*—Jean M. Corrielus
*Assistant Examiner*—Joon Hwan Hwang
(74) *Attorney, Agent, or Firm*—RatnerPrestia

(57) ABSTRACT

A receiving device includes: a receiving section for receiving first data including a plurality of data items; an accumulative storage section in which at least one of the plurality of data items is stored; a free space capacity acquiring section for acquiring a free space capacity of the accumulative storage section; an accumulation level determining section for determining a data item to be stored in the accumulative storage section; a data extraction section for extracting a data item from the first data based on the determination by the accumulation level determining section; and a data writing section for writing the data item extracted by the data extraction section in the accumulative storage section, wherein the accumulation level determining section includes a storage data determining section for determining the data item to be extracted from the first data based on predetermined parameters, and the parameters include at least the free space capacity.

8 Claims, 17 Drawing Sheets

FIG.4

Information amount function table 53

| Free space capacity (byte) | Accumulation level value |
|---|---|
| 5M or more | 4 |
| 1M or more and smaller than 5M | 3 |
| 100K or more and smaller than 1M | 2 |
| 0 or more and smaller than 100K | 1 |

Time function table

| Month | Accumulation level value |
|---|---|
| 1 | 1 |
| 2 | 2 |
| 3 | 2 |
| 4 | 3 |
| 5 | 3 |
| 6 | 4 |
| 7 | 4 |
| 8 | 4 |
| 9 | 3 |
| 10 | 3 |
| 11 | 2 |
| 12 | 1 |

Information amount function table

| Free space capacity (byte) | Accumulation level value |
|---|---|
| 5M or more | 4 |
| 1M or more and smaller than 5M | 3 |
| 100K or more and smaller than 1M | 2 |
| 0 or more and smaller than 100K | 1 |

38  39

Parameter table

| Item | Content |
|---|---|
| Data attribute data | Catalog Beer |
| User information | Beer |
| Free space capacity | 2M (byte) |
| Date | 1999/11/23 |

Parameter table

| Item | Content |
|---|---|
| Data attribute data | Catalog Beer |
| User information | Beer |
| Preference concentration ratio flag | 3 |
| Free space capacity | 2M (byte) |
| Date | 1999/11/23 |

FIG.20

| Title data | (100 bytes) |
|---|---|
| Text data | (10K bytes) |
| Sound data | (1M bytes) |
| Video data | (100M bytes) |

RECEIVING DEVICE

BACKGROUND OF THE INVENTION

1. Field of the Invention:

The present invention relates to a receiving device for receiving data, and specifically to a receiving device for filtering received data, and extracting a portion or the entirety of the received data for accumulation in a storage medium.

2. Description of the Related Art:

Along with the spread of networks such as the internet and with the study and development of the digital broadcasting, the research and development of receiving devices, by which a user receives data such as texts, images, sounds, etc., through networks or radio waves and manages the received data, has been progressing. In a receiving device of such a type, data is automatically received and stored in a storage medium, and the stored data is processed and utilized by a user at any time. Receiving devices of such a type automatically receive data and store the received data in a storage medium, and the stored data is processed and utilized by a user at any time. In such a receiving device, when the received data is stored in the storage medium, the entirety of the data is stored with no consideration for the volume of the received data and the free space of the storage medium. Thus, such a receiving device requires a user to make efforts to edit contents stored in the storage medium, to make a reservation for receiving data, etc., in order to surely store the data she/he prefers. Furthermore, when the user missed editing the contents in the storage medium, or when the user forgot or failed to make a reservation, received data important for the user could not be stored.

Japanese Laid-Open Publication No. 8-339385 discloses a device for storing data with consideration for the capacity of the free space of a storage medium, although the subject matter disclosed in this document falls in a different technology from that of the present invention. Specifically, the device disclosed in this publication is an information retrieval device, in which data retrieved from a database is thinned by filtering according to the capacity of a free space of a user's storage medium and the use state of data previously stored in the storage medium, and the thinned data is stored in the storage medium. In the filtering process, the capacity of a free space of the storage medium and the total amount of deleted data, e.g., the amount of data which has been utilized and deleted by a user within a specific period of time, are classified into a plurality of levels, and the capacity allocated to a single data item to be stored is determined according to levels of the capacity of a free space and the total amount of deleted data. Specifically, when the capacity of a free space or the total capacity of deleted data is 0–100 Kbyte, 100 byte of data is stored for one article; when the capacity of a free space or the total capacity of deleted data is 100 Kbyte to 1 Mbyte, 500 byte of data is stored for one article; when the capacity of a free space or the total capacity of deleted data is 1–5 Mbyte, 1 Mbyte of data is stored for one article; and when the capacity of a free space or the total capacity of deleted data is 5 Mbyte of more, the filtering is not conducted.

However, the information retrieval device disclosed in Japanese Laid-Open Publication No. 8-339385 is intended to deal with text data which is obtained as a search result, such as document information, news articles, etc., and thins the data for storage in accordance with the capacity of the free space of the storage medium at the risk of losing necessary information. On the other hand, in the digital broadcasting application, a certain information content is represented by text data, sound data, video data, etc., and the information content is transmitted by means of the combination of these different data types. Thus, the technique disclosed in Japanese Laid-Open Publication No. 8-339385 is not applicable to a network and a digital transmission/reception system which deal with sound data, video data, etc., in addition to text data.

Furthermore, according to the technique disclosed in Japanese Laid-Open Publication No. 8-339385, retrieved data to be stored by the information retrieval device in the storage medium is data retrieved by the user herself/himself. Accordingly, it is recognized that the data retrieved by the information retrieval device is data a user wants to acquire to some extent. Thus, the efficient use of the storage medium can be expected by this technique.

On the other hand, in a receiving device in which digitally broadcast data such as text data, video data, sound data, etc., are received through a network or a radio wave, data is transmitted regardless of user's demands.

Therefore, in the case of applying the technique disclosed in Japanese Laid-Open Publication No. 8-339385 to a receiving device which receives digitally broadcast data through a network or a radio wave, data is reduced to conform with an evenly allocated data capacity in accordance with the capacity of a free space regardless of the content (importance) of the data. Accordingly, data which is not important for the user may occupy a large part of the capacity of the storage medium. Furthermore, as a result of this, data which is important for the user cannot be stored in sufficient amounts. Still further, the amount of data to be stored is determined according to the amount of data which has been deleted by the user in a certain period of time. Thus, in the case where the data deleted by the user in the certain period of time is small, even data important for the user cannot be stored in sufficient amounts.

SUMMARY OF THE INVENTION

According to one aspect of the present invention, the receiving device includes: a receiving section for receiving first data including a plurality of data items; an accumulative storage section in which at least one of the plurality of data items is stored; a free space capacity acquiring section for acquiring a free space capacity of the accumulative storage section; an accumulation level determining section for determining a data item to be stored in the accumulative storage section; a data extraction section for extracting a data item from the first data based on the determination by the accumulation level determining section; and a data writing section for writing the data item extracted by the data extraction section in the accumulative storage section, wherein the accumulation level determining section includes a storage data determining section for determining the data item to be extracted from the first data based on predetermined parameters, and the parameters include at least the free space capacity.

In one embodiment of the present invention, the first data includes a data attribute, and the parameters further include the data attribute.

In another embodiment of the present invention, the receiving device further includes: a user information storage section for storing information associated with a user as user information; and a user information acquiring section for acquiring the user information from the user information storage section, wherein the parameters include the user information.

In still another embodiment of the present invention, the user information includes a preference concentration ratio flag representing whether or not a user's preference is concentrated in a specific field.

According to another aspect of the present invention, the receiving device includes: a receiving section for receiving first data including a plurality of data items: an accumulative storage section in which at least one of the a plurality of data items is stored; a date management section for managing a date; an accumulation level determining section for determining a data item to be stored in the accumulative storage section; a data extraction section for extracting the data item from the first data based on the determination by the accumulation level determining section; and a data writing section for writing the data item extracted by the data extraction section in the accumulative storage section, wherein the accumulation level determining section includes an accumulation data determining section for determining the data item to be extracted from the first data based on predetermined parameters, the plurality of data items each include a data attribute, and the parameters include at least the data attribute and the date.

In one embodiment of the present invention, the receiving device further includes a free space capacity acquiring section for obtaining a free space of the accumulative storage section, wherein the parameters further include at least the free space capacity.

In another embodiment of the present invention, the receiving device further includes: a user information storage section for storing information associated with a user as user information; and a user information acquiring section for acquiring the user information from the user information storage section, wherein the parameters further include the user information.

In still another embodiment of the present invention, the user information includes a preference concentration ratio flag representing whether or not a user's preference is concentrated in a specific field.

Thus, the invention described herein makes possible the advantage of providing a receiving device capable of accumulatively storing data with a high degree of the user's satisfaction by extracting and storing a portion or the entirety of data, which has been received by the receiving device, with consideration for the user's preference and/or the capacity of the free space of the storage medium.

This and other advantages of the present invention will become apparent to those skilled in the art upon reading and understanding the following detailed description with reference to the accompanying figures.

BRIEF DESCRIPTION OF THE DRAWINGS

FIG. 3A shows constituent items of the data attribute data. FIG. 3B shows a specific example of the constituent items of the data attribute data.

FIG. 4 shows an information amount function table which is a table function used as an accumulation data determining function, with which an estimation value of the accumulation level is determined based on the capacity of the free space of a storage medium.

FIG. 8A shows constituent items of the data attribute data. FIG. 8B shows a specific example of the constituent items of the data attribute data.

FIGS. 10A and 10B each show a table function used as an accumulation data determining function. FIG. 10A shows a time function table by which a candidate value of the accumulation level is determined in accordance with months. FIG. 10B shows an information amount function table by which an estimation value of the accumulation level is determined in accordance with the capacity of a free space of a storage medium.

FIG. 20 shows reference amounts of information for respective data items of the received data.

DESCRIPTION OF THE PREFERRED EMBODIMENTS

Hereinafter, embodiments of the present invention will be described with reference to the drawings.

Embodiment 1

A receiving device according to embodiment 1 of the present invention accumulatively stores a portion or the entirety of received data in a storage medium provided in the receiving device. In determining the amount of the received data to be accumulatively stored, the capacity of a free space (hereinafter, referred to as "free space capacity") of the storage medium in which the received data can be accumulatively stored, and the data attribute of the received data, are considered. Herein, it should be noted that the case where "a portion or the entirety of the received data is accumulatively stored in a storage medium provided inside the receiving device" may include a case where no portion of the received data is accumulatively stored.

Figure 2:
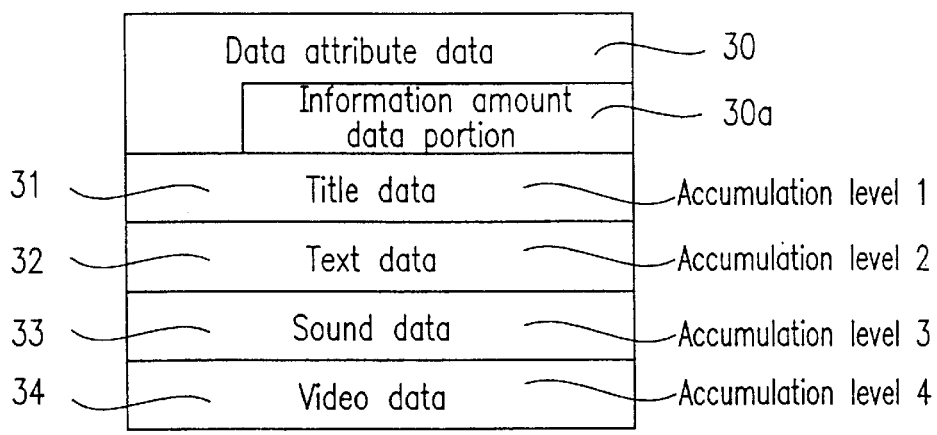
FIG. 2 shows a structure of data received by the receiving device shown in FIG. 1.
Figure 3A:
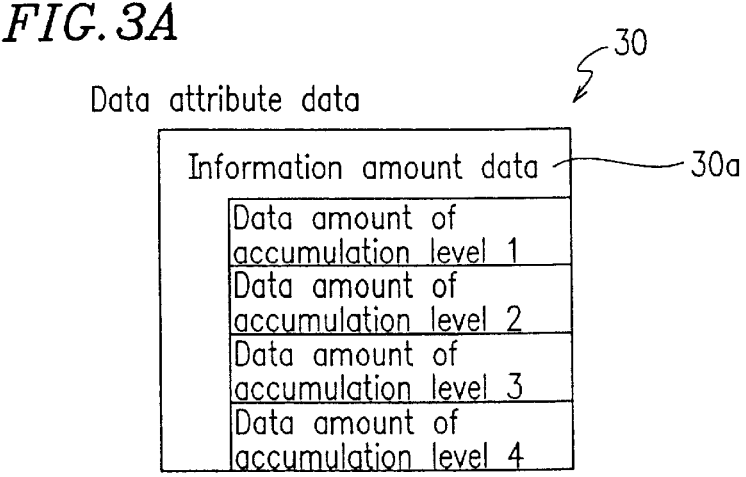
FIGS. 3A and 3B show a data attribute data included in the data shown in FIG. 2.
Figure 3B:
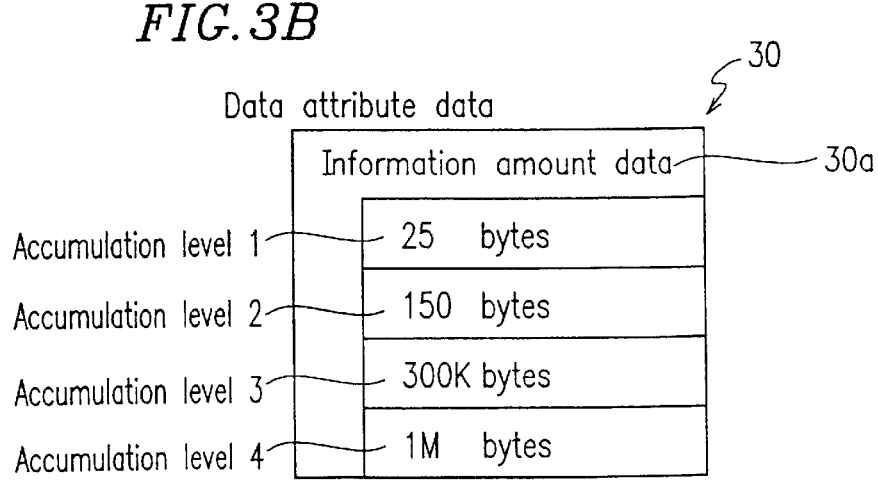

The received data may be various types of data such as catalogs, movies, event information, "various advertising information", etc. Embodiment 1 is described with taking catalog data as an example. An exemplary structure of the received catalog data as shown in FIG. 2 includes data attribute data 30, title data 31 of the catalog, text data 32 which is the content of the catalog, sound data 33, and video data 34. Among these data items, data to be accumulatively stored are selected. Furthermore, as shown in FIGS. 3A and 3B, the data attribute data 30 includes an information amount data portion 30a in which the information amount of each data item to be accumulatively stored is recorded. As shown in FIG. 2, labels, "level 1", "level 2", "level 3", . . . , are attached to the data items in the order of data amount from the largest to the smallest. (In this example, the title data 31 is on level 1.) Herein, these levels are referred to as accumulation levels, and the degree of the accumulation level is represented by an accumulation level value. The accumulation level value of the accumulation level 1 is "1".

It should be noted that the data to be received is not limited to a structure as shown in FIGS. 2, 3A and 3B, and settings for data items, the number of data items, etc., may be modified appropriately. Furthermore, each data may necessarily include title data 31.

Figure 1:
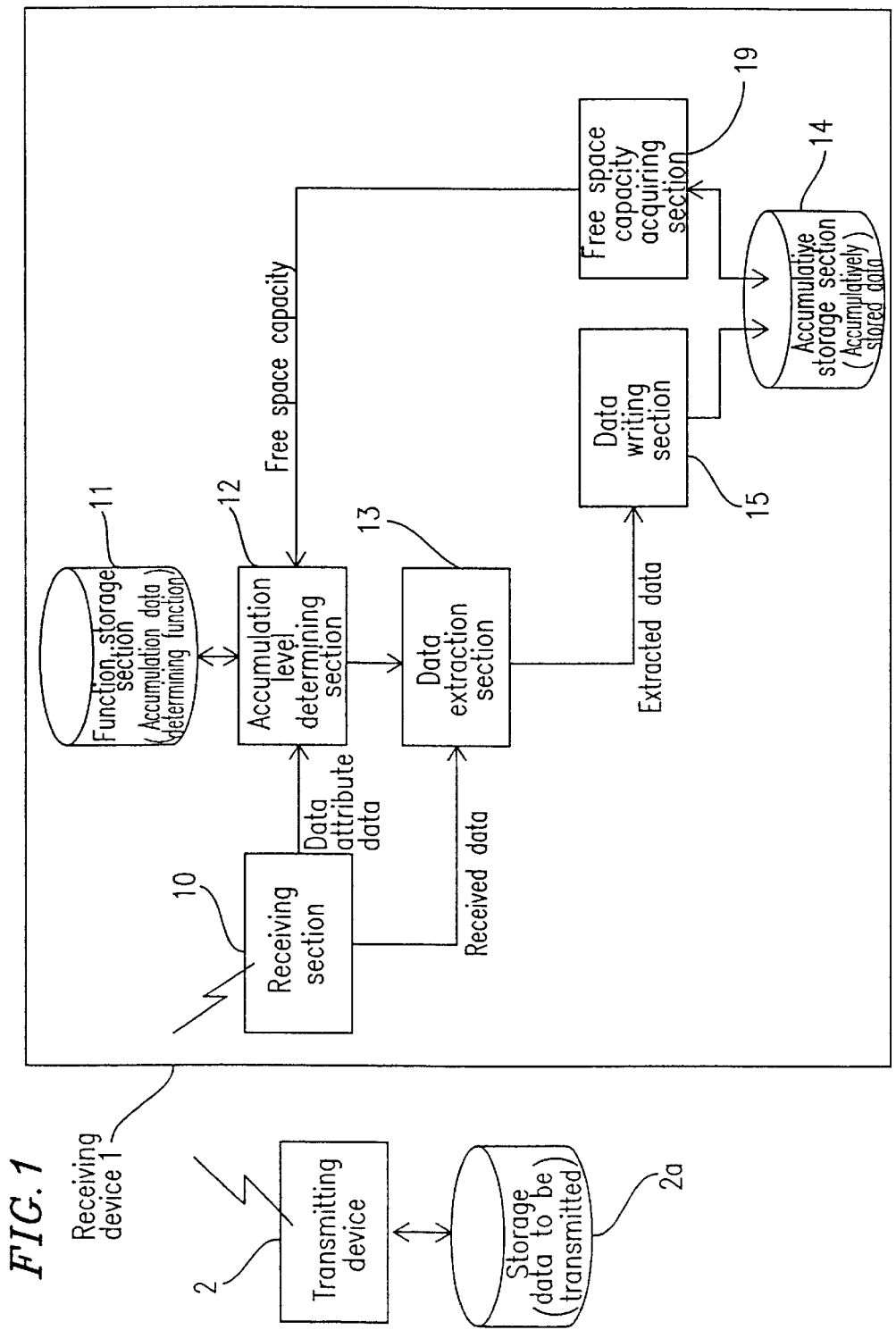
FIG. 1 is a block diagram showing a schematic structure of a receiving device according to embodiment 1 of the present invention.

FIG. 1 shows a structure of a receiving device according to embodiment 1 of the present invention. The receiving device 1 includes a receiving section 10 for receiving data transmitted from a transmitting device 2; a function storage section 11 for storing a function for determining data to be accumulated (hereinafter, referred to as "accumulation data determining function"), which is used to obtain information representing which data item is to be stored among data items included in the received data (accumulation level value); an accumulation level determining section 12 for determining the accumulation level based on the accumulation data determining function which is stored in the function storage section 11; a data extraction section 13 for extracting, from the received data, data items to be accumulatively stored based on the accumulation level value determined in the accumulation level determining section 12; an accumulative storage section 14 for accumulatively storing the data items extracted in the data extraction section 13 which is a portion or the entirety of the received data; and a data writing section 15 through which the extracted data items are accumulatively stored in the accumulative storage section 14.

The receiving device 1 further includes a free space capacity acquiring section 19 for checking the free space capacity of the accumulative storage section 14 and providing the free space capacity to the accumulation level determining section 12 as a parameter of the accumulation data determining function.

The free space capacity acquiring section 19 acquires the capacity (e.g., in bytes) of the free space of the accumulative storage section 14 (storage medium) at the time of receiving data from the transmitting device 2.

The free space capacity of the storage medium (accumulative storage section 14) is given as a parameter to the accumulation data determining function, and then information representing which data item included in the received data is to be accumulatively stored (accumulation level value) is calculated. Examples of the accumulation data determining function include a table function in which input-to-output conditions are determined based on a table consisting of a plurality of lists wherein respective items correspond to each other between the lists, a function in which input-to-output conditions are determined on the if-then-else basis, and a function in which input-to-output conditions are determined by a general numerical function. In embodiment 1, a table function as shown in FIG. 4 is employed. The table of FIG. 4 is an information amount function table 53 showing the correspondence between a free space capacity list 51 for the storage medium (accumulative storage section 14) and an accumulation level value list 52 for the received data.

Data having the structure as shown in FIGS. 2 and 3A are stored in a storage 2a provided to the transmitting device 2 (FIG. 1). In the data transmission/reception system including the transmitting device 2 and the receiving device 1, the transmitting device 2 transmits the data stored in the storage 2a to the receiving device 1, the receiving device 1 receives the transmitted data at the receiving section 10, a portion or the entirety of the received data (data item) is extracted by the data extraction section 13, and the extracted data is accumulatively stored in the accumulative storage section 14 through the data writing section 15.

Figure 5:
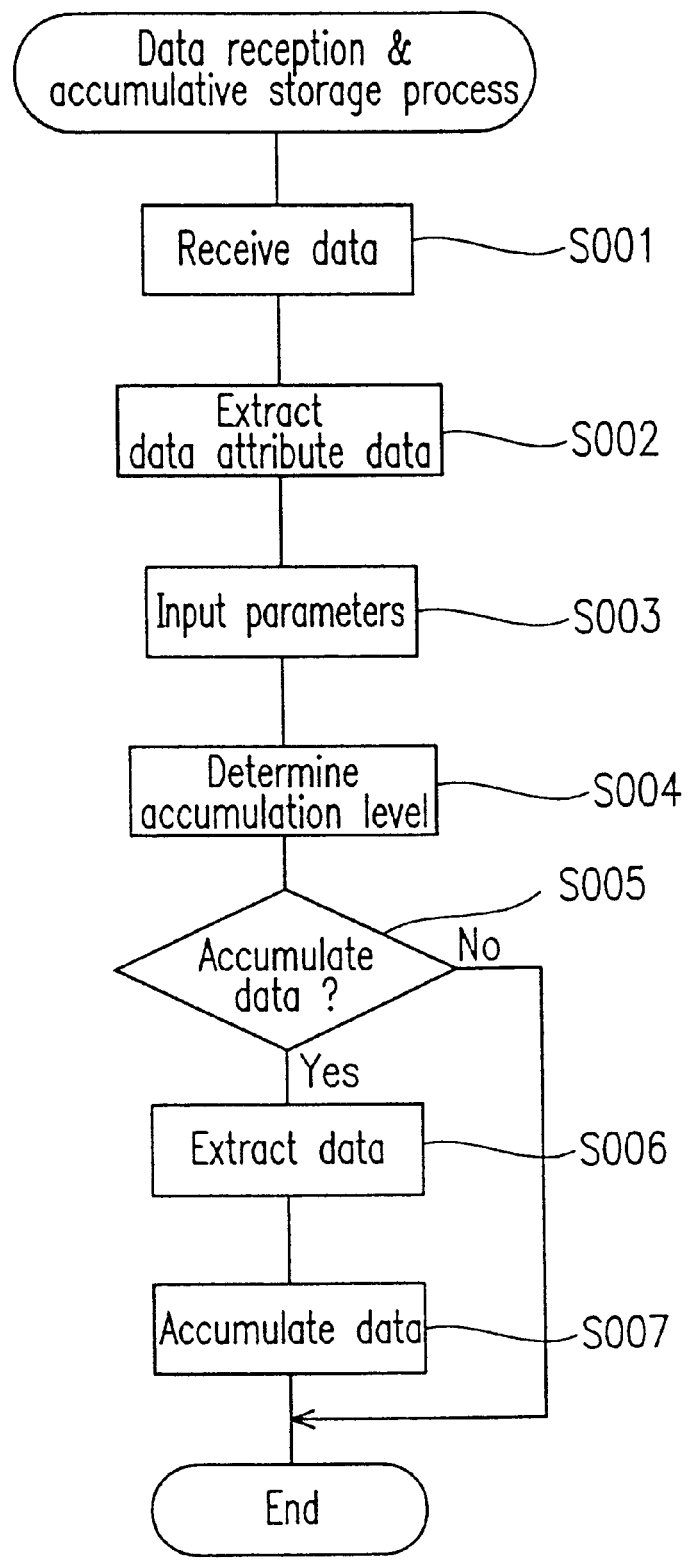
FIG. 5 is a flowchart illustrating a process from the reception of data to the accumulative storage of the data in a storage medium.

Next, a process from the data reception by the receiving device 1 to the accumulative storage of a data item into the accumulative storage section 14 is described with using the flow chart of FIG. 5 in conjunction with FIG. 1.

FIG. 5 is a flow chart showing a process from a step in which data transmitted from the transmitting device 2 is received by the receiving device 1 at the receiving section 10 to a step in which a portion or the entirety of the received data (data item) is stored in the accumulative storage section 14.

First, data transmitted from the transmitting device 2 is received by the receiving device 1 at the receiving section 10 (step S001).

The receiving section 10 extracts data attribute data 30 (FIG. 2) from the received data, and supplies the extracted data attribute data to the accumulation level determining section 12 (S002).

Next, the free space capacity acquiring section 19 checks the free space capacity of the accumulative storage section 14 (storage medium), and supplies the free space capacity information to the accumulation level determining section 12 as a parameter of the accumulation data determining function (S003).

Next, the accumulation level determining section 12 obtains from the function storage section 11 the information amount function table 53 (FIG. 4) as the accumulation data determining function, and refers to the information amount function table 53 with using the free space capacity of the accumulative storage section 14 as a parameter, thereby obtaining information (accumulation level value) representing which portion (which data item) of the received data is to be accumulatively stored (S004).

Based on the information amount function table 53 (FIG. 4), the accumulation level value is determined according to the free space capacity of the storage section 14 so that: the accumulation level value is "1" in the case where the free space capacity is "0 byte or more and smaller than 100 Kbyte"; when the free space capacity is "100 Kbyte or more and smaller than 1 Mbyte", the accumulation level value is "2"; when the free space capacity is "1 Mbyte or more and smaller than 5 Mbyte", the accumulation level value is "3"; and when the free space capacity is "5 Mbyte or more", the accumulation level value is "4". Moreover, in the case where the free space capacity of the storage section 14 is smaller than the sum of the information amounts of respective data items corresponding to the obtained accumulation level values, the accumulation level determining section 12 outputs the accumulation level value "0". For example, in the case where the accumulation level value is "1" (the information amount is 25 byte as seen from FIG. 3B), and the free space capacity is less than 25 byte, the accumulation level determining section 12 outputs the accumulation level value "0".

In the case where the accumulation level value determined based on the accumulation data determining function is not "0", i.e., in the case where at least a portion of the received data (at least one data item) is stored in the accumulative storage section 14 ("Yes" at step S005), the accumulation level determining section 12 supplies the accumulation level value to the data extraction section 13. The data extraction section 13 receives the received data from the receiving section 10, and extracts a portion or the entirety of the received data (data item) based on the accumulation level value (S006). Alternatively, in the case where the accumulation level value is "0" ("No" at step S005), the data reception and accumulative storage process ends without accumulatively storing the received data in the accumulative storage section 14.

Next, the data extraction section 13 supplies the data (data item) extracted from the received data to the data writing section 15. The data writing section 15 writes the extracted data in the accumulative storage section 14 (S007).

As described hereinabove, the receiving device 1 accumulatively stores a portion or the entirety of the received data (data item) in the accumulative storage section 14.

It should be noted that the present invention is not limited to the above embodiment, and various modifications can be made thereto. For example, the information amount function table 53 shown in FIG. 4 is set so that a large number of data items can be accumulated as large as possible within the limit of the free space capacity. However, the information amount function table 53 may be set so that a small number of data items each having a large amount of information are accumulated.

In the receiving device having the above structure, different types of data to be stored in the storage section, such as text data, sound data, and video data, are selectively and accumulatively stored according to the free space capacity of the accumulative storage section. Therefore, undesirable cases can be avoided, for example, where storage of data fails due to a lack of sufficient capacity for storing necessary information for a user, or where necessary portions of the data cannot be completely stored even in the presence of sufficient free space capacity. Thus, the capacity of the storage section can be efficiently utilized.

Embodiment 2

Figure 6:
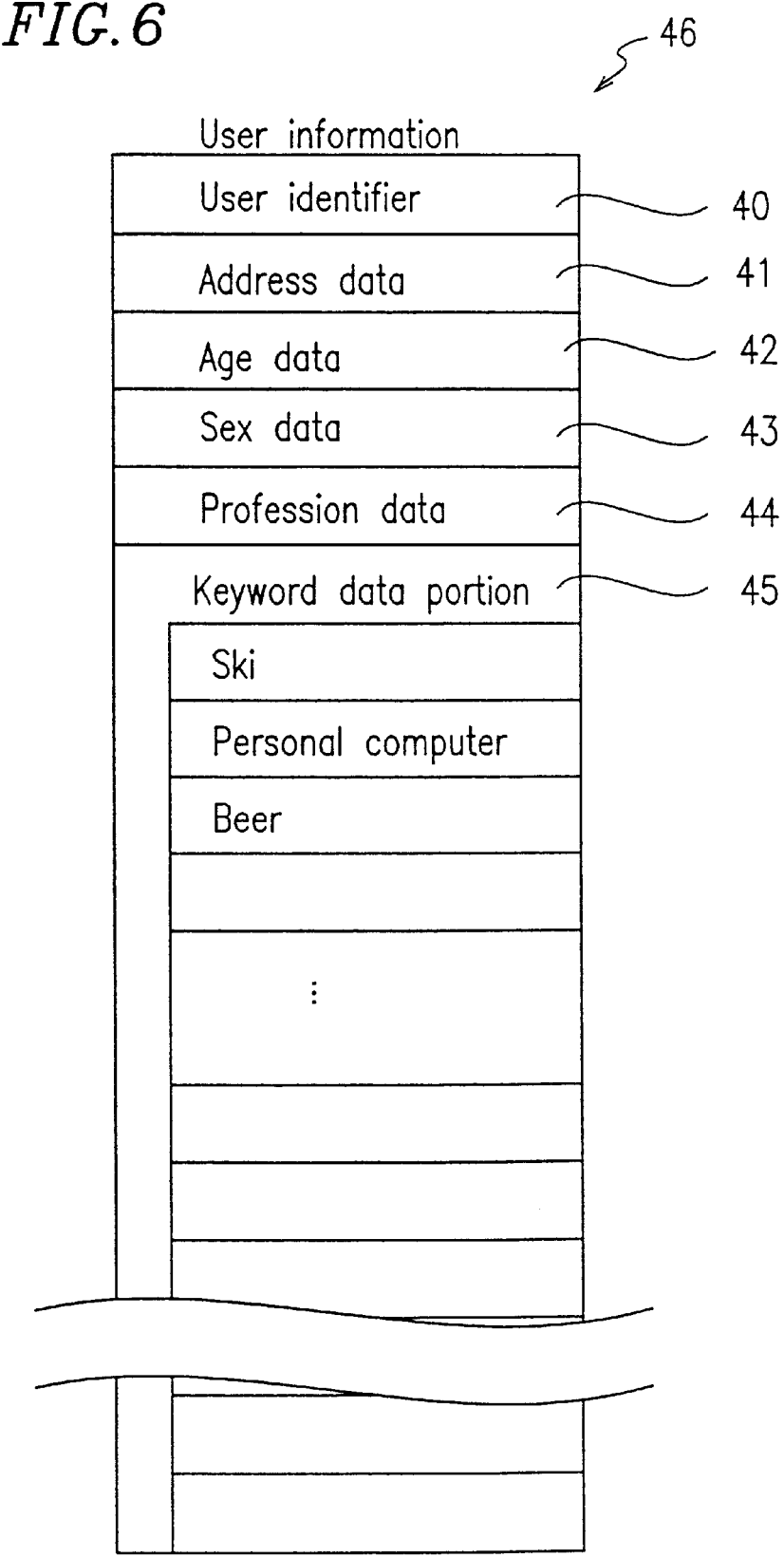
FIG. 6 shows a structure of user information according to embodiment 2.

A receiving device according to embodiment 2 of the present invention accumulatively stores a portion or the entirety of received data in a storage medium provided inside the receiving device. In determining which portion of the received data is to be accumulatively stored, the date of the day when the data is received, data attribute of the received data, and user information of a user who reads the received data are considered in addition to the free space capacity of the storage medium in which the received data is to be stored. For example, as shown in FIG. 6, a user information 46 includes various information such as a user identifier 40, an address data 41, an age data 42, a sex data 43, a profession data 44, subjects of user's interest (keyword data portion 45), etc. It should be noted that the case where "a portion or the entirety of the received data is accumulatively stored in a storage medium provided inside the receiving device" may include a case where no portion of the received data is accumulatively stored.

Figure 7:
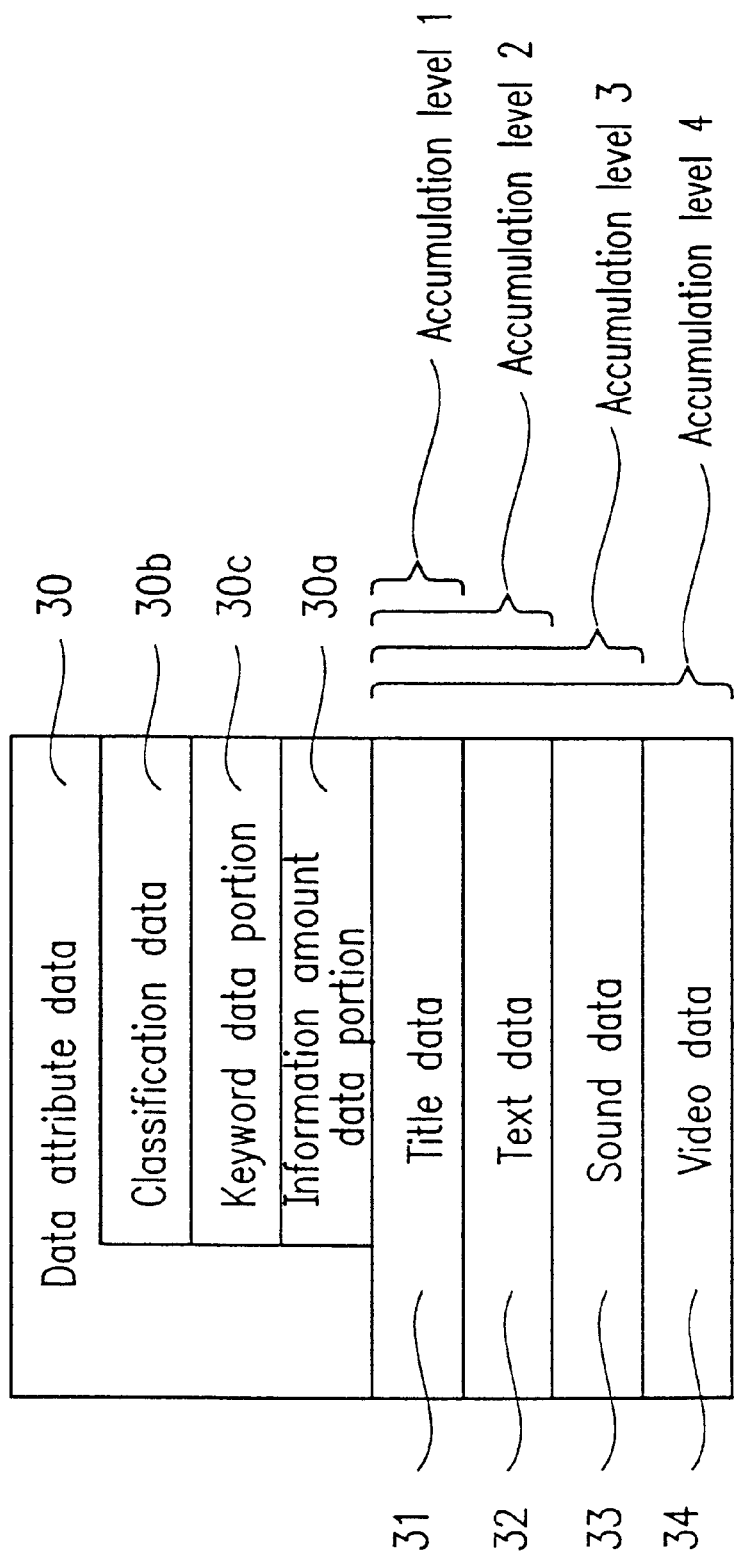
FIG. 7 shows a structure of received data according to embodiments 2 and 3.

Also in embodiment 2, the exemplary data to be received is data relating to catalogs as in embodiment 1. An example thereof is structured, as shown in FIG. 7, so as to include data attribute data 30, title data 31 of the catalog, text data 32 which is a content of the catalog, sound data 33, and video data 34. Herein, it should be noted that the type and the number of data items included in the received data are not limited to those shown in the example of FIG. 7. The data items except for the data attribute data 30 are accumulatively stored such that any of the following combinations, "title data 31", "title data 31 and text data 32", "title data 31, text data 32, and sound data 33", and "title data 31, text data 32, sound data 33, and video data 34", is stored. As shown in FIG. 7, labels, "level 1", "level 2", "level 3", "level 4", . . . , are attached to the respective combinations of data items in the order of data amount from the largest. (In this example, "title data 31" is on level 1.) Herein, these levels are referred to as accumulation levels, and the degree of the accumulation level is represented by an accumulation level value. The accumulation level value of the accumulation level 1 is "1".

Figure 8A:
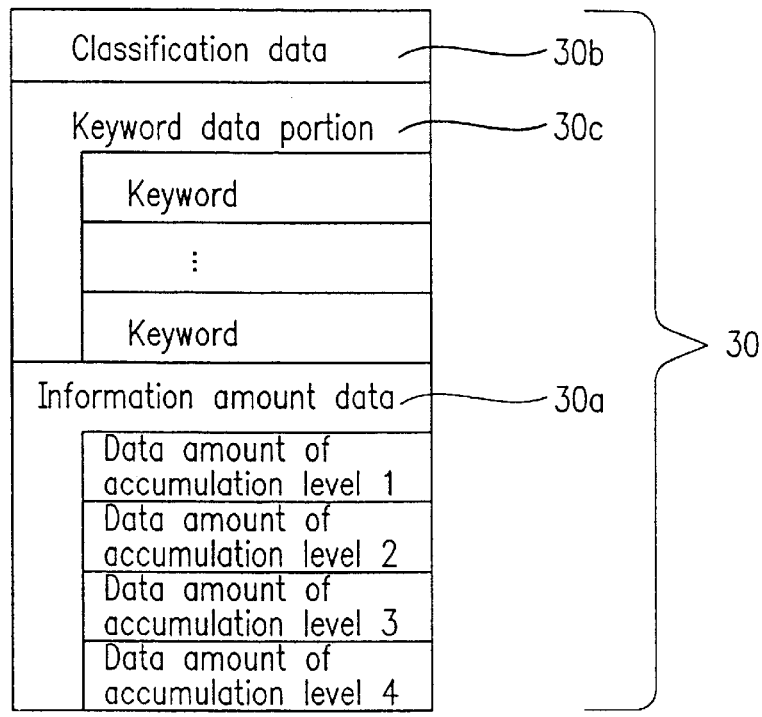
FIGS. 8A and 8B show a data attribute data included in the data shown in FIG. 7.
Figure 8B:
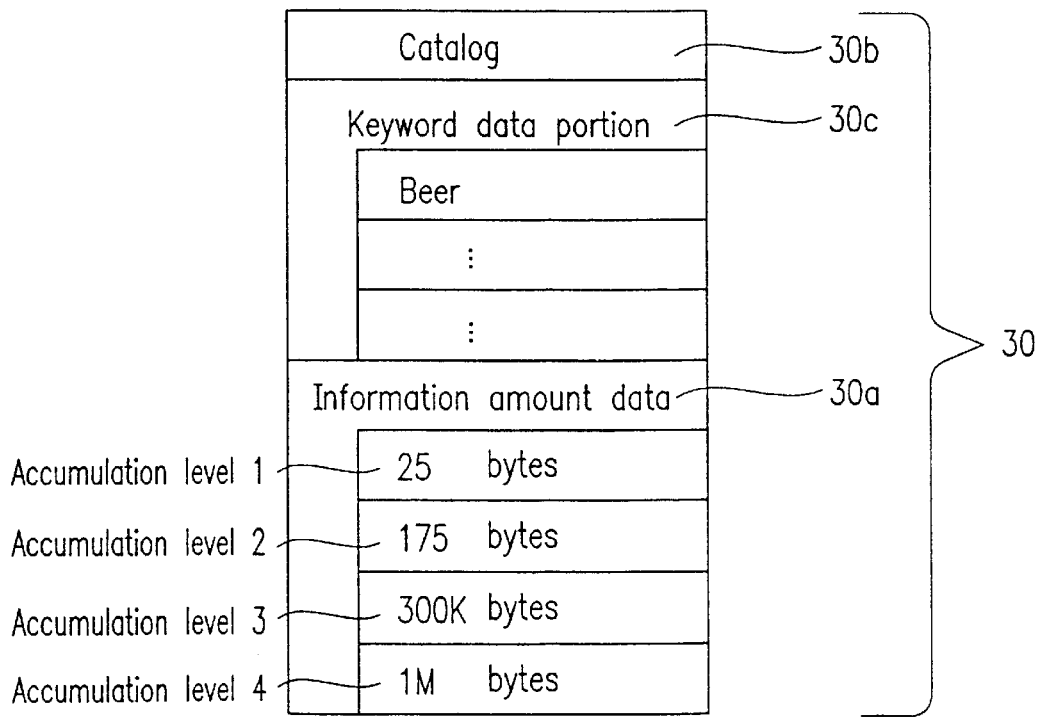

The data attribute data 30 (FIG. 7) of the received data has a structure as shown in FIG. 8A, which includes classification data 30b which represents the class of data, a keyword data portion 30a of the received data, and an information amount data portion 30a consisting of a plurality of items which represent the information amount for each accumulation level. The classification data 30b includes a class such as catalogs, news, event information, etc. The keyword data portion 30c includes keywords such as beer and skiwear (subjects of catalog), politics, economics, sports, and names of country (news genre), flee market, names of actors/actresses, names of theatrical companies (contents of event information), etc. In embodiment 2, as shown in FIG. 8B, data to be received is a catalog data relating to beer. "Catalog" is stored in the classification data 30b, and "beer" is stored in the keyword data portion 30c. The information amount for each accumulation level is as shown in FIG. 8B.

Figure 9:
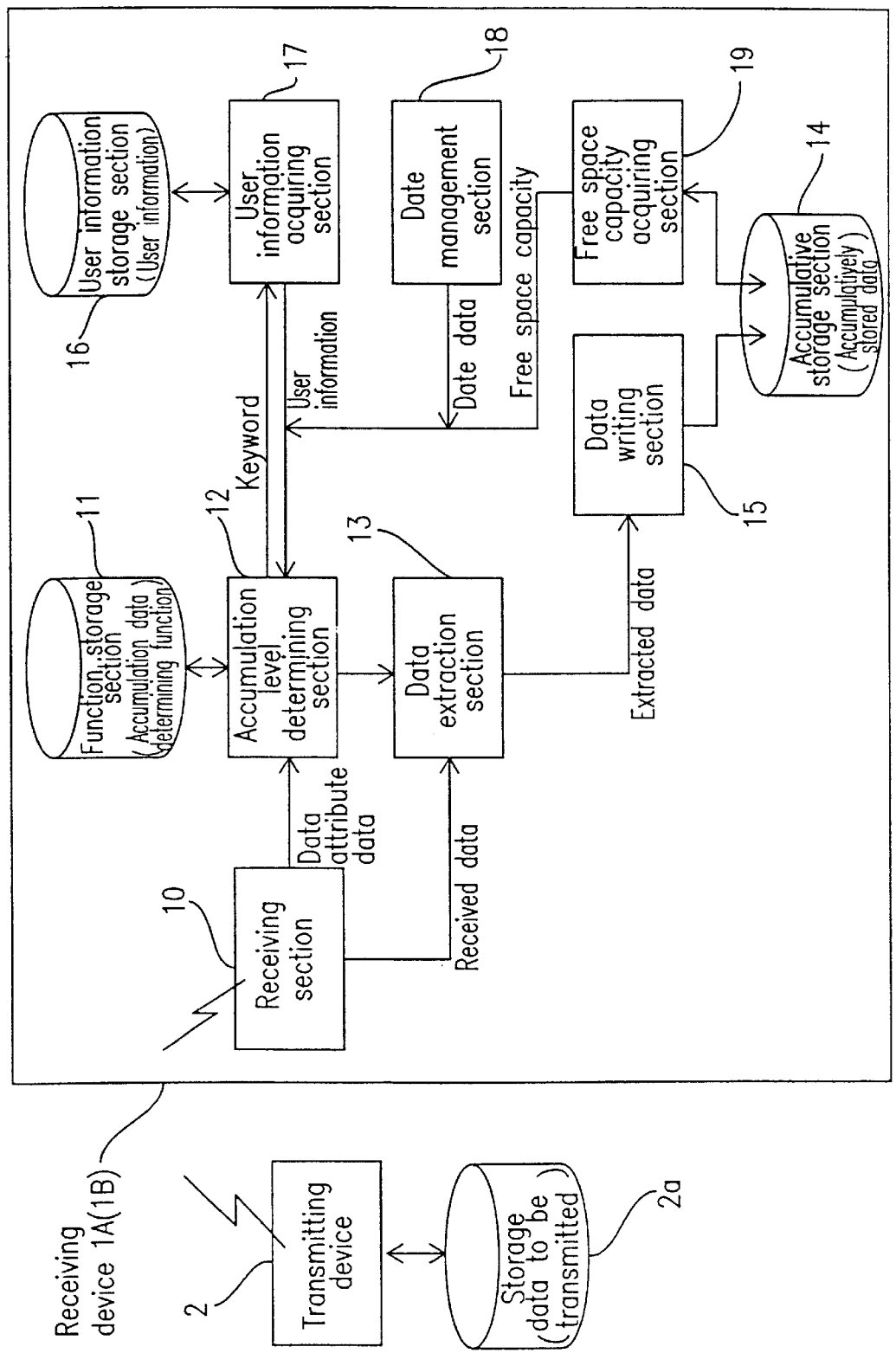
FIG. 9 is a block diagram showing a schematic structure of a receiving device according to embodiment 2 or 3 of the present invention.

FIG. 9 shows a structure of a receiving device according to embodiment 2 of the present invention. The receiving device 1A includes a receiving section 10 for receiving data transmitted from a transmitting device 2; a function storage section 11 for storing an accumulation data determining function which is used to obtain information representing which portion of the received data is to be stored (accumulation level value); an accumulation level determining section 12 for determining the accumulation level based on the accumulation data determining function which is stored in function storage section 11; a data extraction section 13 for extracting, from the received data, a portion of the received data (data item) to be accumulatively stored based on the accumulation level value determined in the accumulation level determining section 12; an accumulative storage section 14 (storage medium) f or accumulatively storing the data (data item) extracted in the data extraction section 13 which is a portion or the entirety of the received data; and a data writing section 15 through which the extracted data is accumulatively stored in the accumulative storage section 14.

The receiving device 1A further includes a user information storage section 16 used as a storage medium for storing user information of a user who reads the received data; a user information acquiring section 17 for managing the user information storage section 16 and for providing the user information to the accumulation level determining section 12 as a parameter of an accumulation data determining function; a date management section 18 for managing the date in the receiving device 1A and for providing the date to the accumulation level determining section 12 as a parameter of the accumulation date determining function; and a free space capacity acquiring section 19 for checking the free space capacity of the accumulative storage section 14 and providing the free space capacity to the accumulation level determining section 12 as a parameter of the accumulation data determining function.

The date managed by the date management section 18 is represented as year/month/day of the Christian Era, for example, represented in YYYY/MM/DD format.

The data structure of the user information which is managed by the user information acquiring section 17 includes, as shown in FIG. 6, data items of the user information such as a user identifier 40, address data 41, age data 42, sex data 43, and profession data 44 as well as the keyword data portion 45 including a plurality of keywords. In the keyword data portion 45, keywords which represent hobbies, interests, and preference of the user are previously provided by the user.

The free space capacity acquiring section 19 acquires the capacity (e.g., in bytes) of the free space of the accumulative storage section 14 (storage medium) at the time of receiving data from the transmitting device 2.

The accumulation data determining function, by which information indicating which portion of the received data (which data item) is to be stored (accumulation level value) is produced, includes a plurality of table functions in each of which input-to-output conditions are represented by a table, as described in embodiment 1. An example of the table functions is shown in FIGS. 10A and 10B. The table function shown in FIG. 10A is a time function table showing the correspondence between months 36 and accumulation levels 37 of the received data. For the time function, a plurality of tables corresponding to the data attributes of the received data have been previously prepared. The table function shown in FIG. 10B is an information amount function table showing the correspondence between the free space capacity ranges 38 of the storage medium (accumulative storage section 14) and the accumulation level values 39 of the received data.

The data having the structure as shown in FIGS. 7 and 8B is contained in a storage 2a provided to the transmitting device 2 (FIG. 9). In the data transmission/reception system including the receiving device 1A and the transmitting device 2, the transmitting device 2 transmits the data contained in the storage 2a to the receiving device 1A; the receiving device 1A receives the transmitted data at the receiving section 10; a portion or the entirety of the received data is extracted by the data extraction section 13 based on the decision of the accumulation level determining section 12; and the extracted data is accumulatively stored in the accumulative storage section 14 through the data writing section 15.

Next, flow charts are used to describe a process from the reception of data by the receiving device 1A to the storage of a portion or the entirety of the received data into the accumulative storage section 14, and a process through which the accumulation level determining section 12 determines which portion (which data item) of the received data is to be accumulatively stored.

Figure 11:
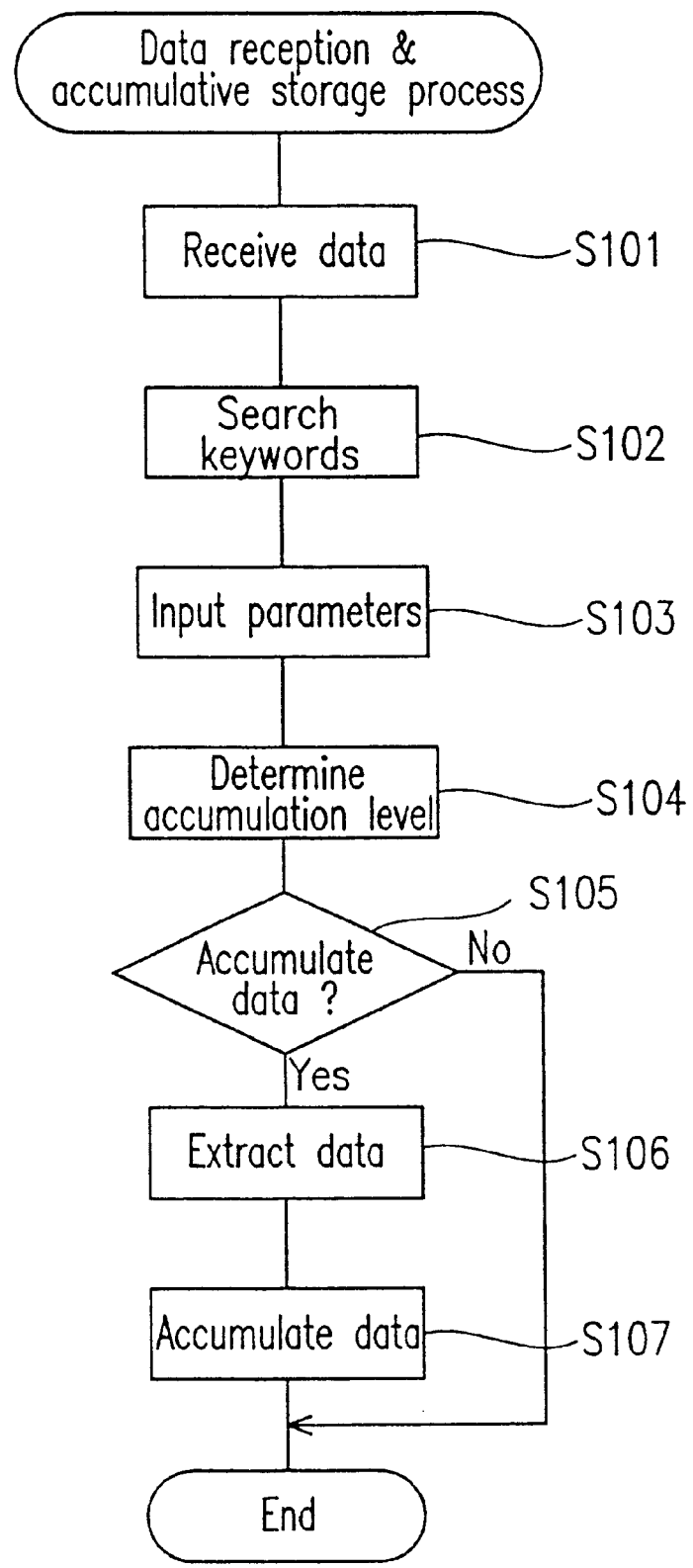
FIG. 11 is a flowchart illustrating a process from the reception of data to the accumulative storage of data in the storage medium in the receiving device according to embodiment 2 or 3.

A flow chart of FIG. 11 shows a process from a step at which data transmitted from the transmitting device 2 is received by the receiving device 1A to a step at which a portion or the entirety of the received data is stored in the accumulative storage section 14. The details of this process are described with reference to FIG. 11 in conjunction with FIG. 9.

First, data transmitted from the transmitting device 2 is received by the receiving device 1A at the receiving section 10 (step S101).

The receiving section 10 extracts data attribute data 30 (FIG. 8B) from the received data, and supplies the extracted data to the accumulation level determining section 12. Upon receiving the extracted data, the accumulation level determining section 12 extracts keywords from the keyword data portion 30c contained in the data attribute data 30 and supplies the extracted keywords to the user information acquiring section 17. The user information acquiring section 17 uses the acquired keywords to search through user information (including keyword data portion 45 (FIG. 6)) contained in the user information storage section 16 for a user preference item that matches with the keywords (S102).

Next, the user information acquiring section 17 supplies the user information including a user preference item that matches with the keyword as a parameter of the accumulation data determining function to the accumulation level determining section 12, and the date management section 18 supplies a current date to the accumulation level determining section 12 as a parameter of the accumulation data determining function. Furthermore, the free space capacity acquiring section 19 checks the free space capacity of the accumulative storage section 14 (storage medium), and supplies the free space capacity information to the accumulation level determining section 12 as a parameter of the accumulation data determining function (S103).

Next, the accumulation level determining section 12 obtains from the function storage section 11 an accumulation data determining function (the time function table and the information amount function table (FIGS. 10A and 10B)) associated with the keywords of the keyword data portion 30c and information amount data 30a in the data attribute data 30 (FIG. 8A) obtained from the receiving section 10. Then, the accumulation level determining section 12 supplies the parameters including t he user information, the date, and the free space capacity to the accumulation data determining function, thereby obtaining information that represents which portion (which data item) of the received data is to be accumulatively stored (accumulation level value) (S104).

In the case where the accumulation level value determined based on the accumulation data determining function is not "0", i.e. , in the case where at least a portion of the received data is to be stored in the accumulative storage section 14 ("Yes" at step S105), the accumulation level determining section 12 supplies the accumulation level value to the data extraction section 13. Then, the data extraction section 13 extracts a portion or the entirety of the data received from the receiving section 10 based on the accumulation level value (S106). Alternatively, in the case where the accumulation level value is "0" ("No" at step S105), this process ends without accumulatively storing any portion (any data item) of the received data to the accumulative storage section 14.

Next, the data extraction section 13 supplies the data extracted from the received data based on the accumulation level to the data writing section 15. The data writing section 15 writes the extracted data in the accumulative storage section 14 (S107).

As described above, the receiving device 1A accumulatively stores a portion or the entirety of the received data in the accumulative storage section 14.

Figure 12:
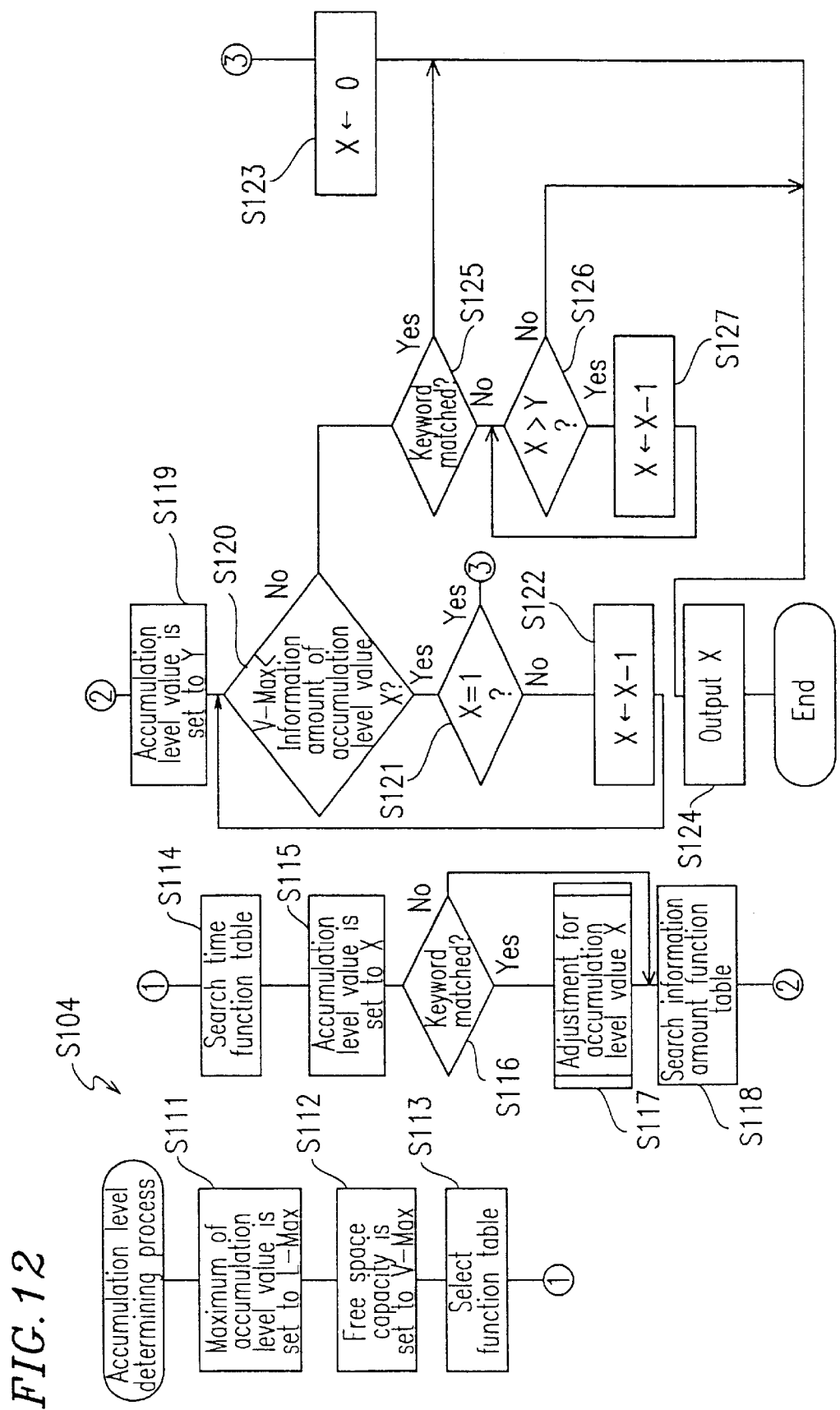
FIG. 12 is a flowchart illustrating a process through which an accumulation level determining section determines a portion of data (data item) of the received data to be accumulatively stored in an accumulative storage section according to embodiment 2.
Figures 13, 14:
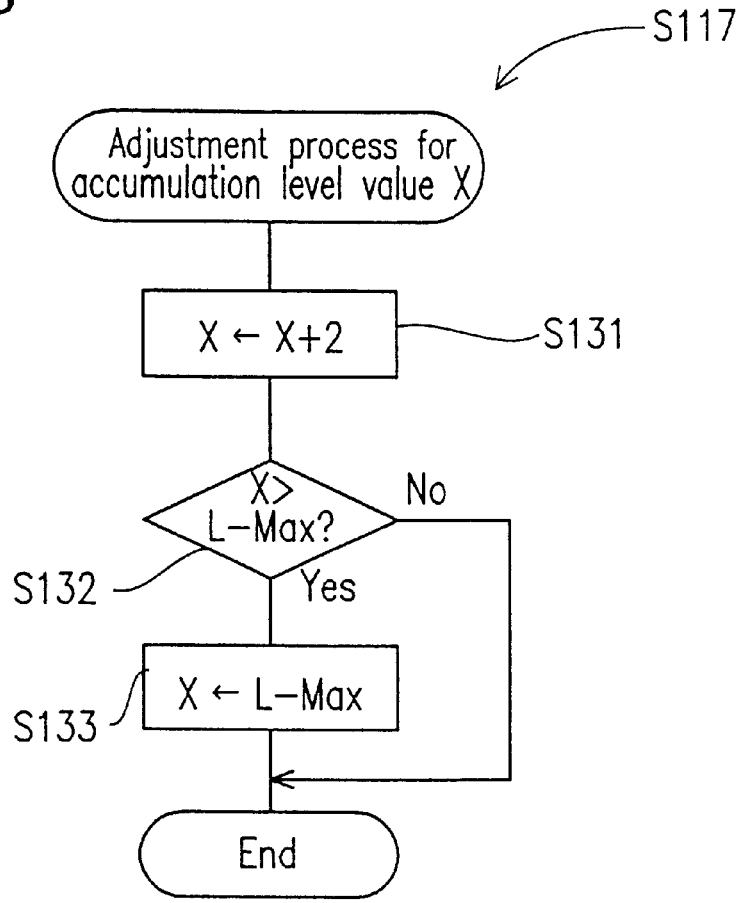
FIG. 13 is a flowchart illustrating a process for adjusting the accumulation level value X according to embodiment 2.
FIG. 14 shows a parameter table showing parameters of the accumulation data determining function according to embodiment 2.

Now, the accumulation level determining process (Step S104) is described in detail with reference to FIGS. 12 and 13 in conjunction with FIG. 9. FIGS. 12 and 13 show flow charts illustrating the process in which the accumulation level determining section 12 provides the free space capacity of the storage medium for storing the received data, the date of the day when the data is received, the data attribute of the received data, and the user information of a user who reads the received data, as parameters to the accumulation data determining function, in order to determine which portion (which data item) of the received data is to be accumulatively stored.

Roughly speaking, the transmitting device 2 transmits data having a structure as shown in FIGS. 7 and 8B, and the receiving device 1A receives the data at the receiving section 10 and stores a portion or the entirety of the received data in the accumulative storage section 14.

On the other hand, user information as shown in FIG. 6 is previously contained in the user information storage section 16.

Specifically, after the receipt of data at the receiving section 10, the accumulation level determining section 12 receives the data attribute data 30 (FIG. 8B) of the received data from the receiving section 10, and provides the keywords contained in the keyword data portion 30c of the data attribute data 30 to the user information acquiring section 17. The user information acquiring section 17 searches through the provided keywords for a keyword identical to any of the user preference items contained in the keyword data portion 45 of the user information (FIG. 6). Then, in the case where a keyword identical to any of the user preference items contained in the user information is found (in the example shown in FIGS. 8B and 6, "Beer"), the user information (containing a user preference item, "Beer") is provided to the accumulation level determining section 12.

The accumulation level determining section 12 receives, in addition to the user information, the data attribute data from the receiving section 10, the date data from the date management section 17, and the free space capacity from the free space capacity acquiring section 19 as parameters for use in the accumulation data determining function.

Examples of the parameters provided to the accumulation level determining section 12 are shown in the table of FIG. 14. In the case where the keyword data portion 45 of the user information 46 does not contain any user preference item that is identical to one of keywords contained in the keyword data portion 30c of the data attribute data 30, the user information is not provided as a parameter. It should be noted that the following description is made on the assumption that the parameters shown in FIG. 14 are provided to the accumulation level determining section 12.

At step S111 of FIG. 12, the accumulation level determining section 12 refers to the information amount data portion 30a of the data attribute data 30 (FIG. 8B) in order to obtain the maximum value of the accumulation level value of the received data (in the example shown in FIG. 8B, the accumulation level value "4" is selected among level 1 to level 4), and stores the obtained maximum value in a register L-Max of the accumulation level determining section 12 (S111). (Herein, the value stored in a register is represented by using the name of the register. In the example shown in FIG. 8B, the value is represented as L-Max=4.)

Next, the free space capacity received from the free space capacity acquiring section 19 is stored in a register V-Max as the largest capacity that represents the amount of data which can be accumulatively stored (S112).

The accumulation level determining section 12 obtains from the data attribute data 30 a classification data 30b, "Catalog", and a keyword of the keyword data portion 30c, "Beer". Furthermore, the accumulation level determining section 12 obtains the time function table (FIG. 10A) and the information amount function table (FIG. 10B) from the function storage section 11 as the accumulation data determining function for determining the accumulation level value (S113). The time function table of FIG. 10A is used to determine a candidate value of the accumulation level using the date provided from the date management section 18 as a parameter, and the information amount function table of FIG. 10B is used to determine an estimation value of the accumulation level using the free space capacity of the accumulative storage section 14 provided from the free space capacity management section 19 as a parameter.

As shown in FIG. 10A, the time function table selected based on the classification data 30b "Catalog" and the keyword "Beer" is structured so that months 36 from January to December correspond to the respective accumulation level values 37. For summer from June to August during which an increase in demand for beer is expected, the accumulation level value is set to a high value, "4", while for the months other than June, July, and August, the accumulation level value is set to a low value, "1", "2", or "3".

As shown in FIG. 10B, the information amount function tables elected based on the classification data 30b "Catalog" and the accumulation level value set in the information amount data portion 30a (equal to L-Max) is structured by the combination of the accumulation level values 39 and the free space capacity ranges 38 the number of which is equal to that of accumulation level values 39. A higher accumulation value corresponds to a larger free space capacity range.

The accumulation level determining section 12 first searches the time function table based on the date in order to obtain a candidate value of the accumulation level (S114). Referring to the table shown in FIG. 14, the date parameter is "Nov. 23, 1999". As a result of searching the time function table (see FIG. 10A) with this date parameter, the accumulation level value "2", which corresponds to November of months 36, is selected as a candidate value of the accumulation level. This candidate value is stored in a register X of the accumulation level determining section 12 (S115).

As described above, in this example, the user information 46 includes a user preference item identical to one or more of the keywords contained in the data attribute data 30 ("Yes" at step S116). Accordingly, "adjustment to the accumulation level value X" is made so that a candidate value X of the accumulation level reflects the user information (S117).

The "adjustment to the accumulation level value X" process at step S117 is described in detail with reference to FIG. 13. As already described, in this example, the user information 46 includes a user preference item identical to one or more of the keywords contained in the data attribute data 30. This means that information contained in the received data includes content that the user is interested in. Then, the candidate value X of the accumulation level is increased from "2" to "4" so as to accumulatively store, in the accumulative storage section 14, more of the data amount which is determined based on a candidate value of the accumulation level obtained from the time function table (S131). However, the accumulation level value has an upper limit, and therefore, in the case where the candidate value X of the accumulation level is increased to a value larger than the maximum value of the accumulation level L-Max ("Yes" at step S132), the candidate value X is set to the maximum value L-Max (S133). In the case where the increased candidate value X is equal to or smaller than the maximum value L-Max ("No" at step S132), the "adjustment to the accumulation level value X" process ends.

After the "adjustment to the accumulation level value X" process has ended, referring again to FIG. 12, the accumulation level determining section 12 then searches the information amount function table (FIG. 10B) based on the free space capacity to obtain an estimation value for measuring the adequacy of the information amount of the data to be accumulatively stored in view of the free space capacity of the accumulative storage section 14 (S118). Referring to the parameter table of FIG. 14, the free space capacity parameter is "2 M(byte) ". As a result of searching the information amount function table (FIG. 10B) with this parameter, the accumulation level value "3", which is set as the accumulation level value corresponding to "1 M or more and less than 5 M" of the information amount 38, is selected as a candidate value of the accumulation level. This candidate value is stored in a register Y of the accumulation level determining section 12 (S119).

Next, the comparison is made between the free space capacity of the accumulative storage section 14, V-Max, and the amount of data to be accumulatively stored when the accumulation level value is X (S120). Considering that the candidate value X of the accumulation level is "4" as a result of the adjustment at step S117, and referring to the accumulation level 4 of the information amount data portion 30a shown in FIG. 8B, the amount of data to be stored is "1 M (byte)". Referring to FIG. 14, the free space capacity of the accumulative storage section 14 is "2 M (byte)".

In the case where the amount of data to be stored when the accumulation level value is X is larger than the free space capacity V-Max ("No" at step S121), the data cannot be stored in the accumulative storage section 14. Thus, X is decremented until the amount of data to be stored when the accumulation level value is X becomes equal to or less than the free space capacity V-Max (S122). However, in the process of decrementation, if the candidate value X of the accumulation level becomes "1" ("Yes" at step S121), the candidate value X is decreased to "0" (S123), and then the decreased value X ("0") is output as the accumulation level value (S124).

Alternatively, as in the example shown in FIGS. 14 and 8B, the free space capacity V-Max ("2 M (byte)") is equal to or larger than the amount of data (1 M (byte)) to be stored when the accumulation level value is X ("4"), the presence of a match between keywords and user preference items is confirmed (S125).

In the case where a matching between keywords and user preference items ("Beer") is found as in the example shown in FIGS. 6 and 8B ("Yes" in step S125), the value X is output as the accumulation level value even if the candidate value of the accumulation level ("4") is larger than the estimation value Y ("3") of the accumulation level (S124).

In the case where no matching is found between keywords and user preference items ("No" at step S125), the comparison is made between the candidate value X ("4") of the accumulation level and the estimation value Y ("3") of the accumulation level. If the candidate value X is larger than the estimation value Y ("Yes" at step S126), the candidate value X is decremented until the candidate value X becomes equal to the estimation value Y (S127).

Alternatively, if the candidate value X of the accumulation level is equal to or smaller than the estimation value Y of the accumulation level ("No" at step S126), the value X is output as the accumulation level value (S124).

According to the process as described hereinbefore, the accumulation level determining section 12 determines the value of the accumulation level, and supplies the determined value to the data extraction section 13. The process after the value of the accumulation level is given to the data extraction section 13 until the data extracted from the received data is accumulatively stored in the accumulative storage section 14 is the same as that described with reference to the flow chart of FIG. 11.

According to the receiving device 1A having the above structure, in determining a portion (data item) of data to be accumulatively stored in the accumulative storage section, information specific to a user which includes hobbies, interests, preferences, etc., are considered. Therefore, a large amount of data necessary for the user is stored, while the reduced amount of data not especially necessary for the user is stored. Thus, the accumulative storage section 14 is efficiently utilized while increasing the degree of the user's satisfaction.

Embodiment 3

Figure 15:
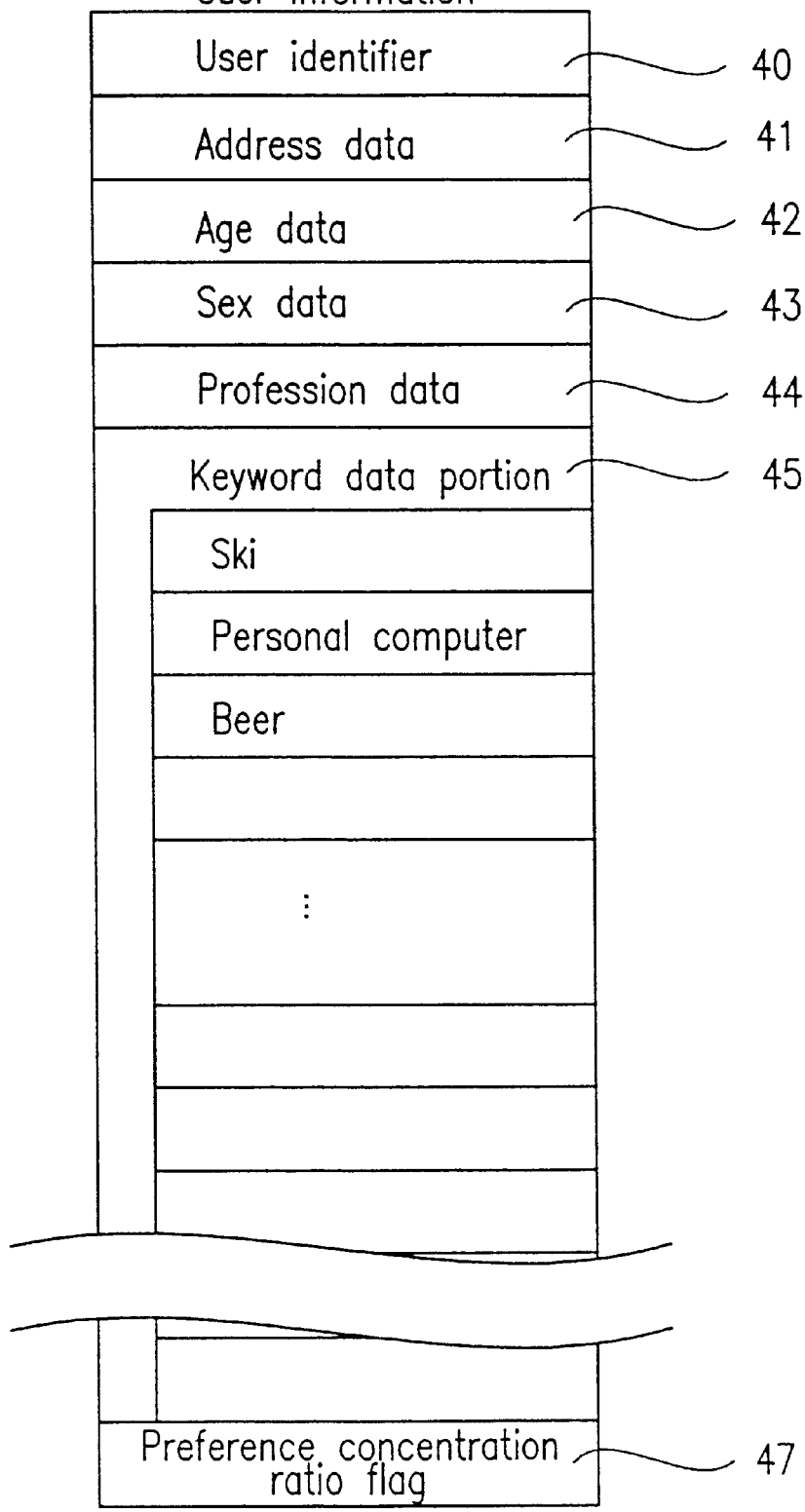
FIG. 15 shows a structure of user information according to embodiment 3.

A receiving device according to embodiment 3 of the present invention is substantially the same as the receiving device of embodiment 2, but different in that the receiving device of embodiment 3 further uses a preference concentration ratio flag 47 for determining which portion (which data item) of the received data is to be accumulatively stored. The receiving device of embodiment 3 is referred to as "receiving device 1B" (FIG. 9). The preference concentration ratio flag 47 is information which represents whether user's hobbies, interests, and preference are concentrated in a small number of subjects or distributed among a large number of subjects. The preference concentration ratio flag 47 is contained in user information as shown in FIG. 15.

The preference concentration ratio flag 47 is set to any of 1, 2, and 3. The value set to the preference concentration ratio flag 47 is determined based on the number of the keywords which are provided in a keyword data portion 45 by the user at the time when the user sets or updates the keyword data portion 45.

When the number of keywords is 1–3, the value of the preference concentration ratio flag 47 is set to "3"; when the number of keywords is 4–10, the value of the preference concentration ratio flag 47 is set to "2"; and when the number of keywords is 11 or more, the value of the preference concentration ratio flag 47 is set to "1". A larger value of the preference concentration ratio flag 47 means that the user's hobbies, interests, and preference are more concentrated in specific subjects. It should be noted that the setting of the preference concentration ratio flag 47 and the method for setting the value of the flag 47 are not limited to the above examples.

The other parts of the structure of the receiving device 1B are the same as those of the receiving device 1A according to embodiment 2 as shown in FIG. 9. The structure of data is also the same as that of embodiment 2 shown in FIGS. 7 and 8B. Furthermore, function tables used as accumulation data determining functions in the accumulation level determining section 12 are the time function table shown in FIG. 10A and the information amount function table shown in FIG. 10B.

Figure 17:
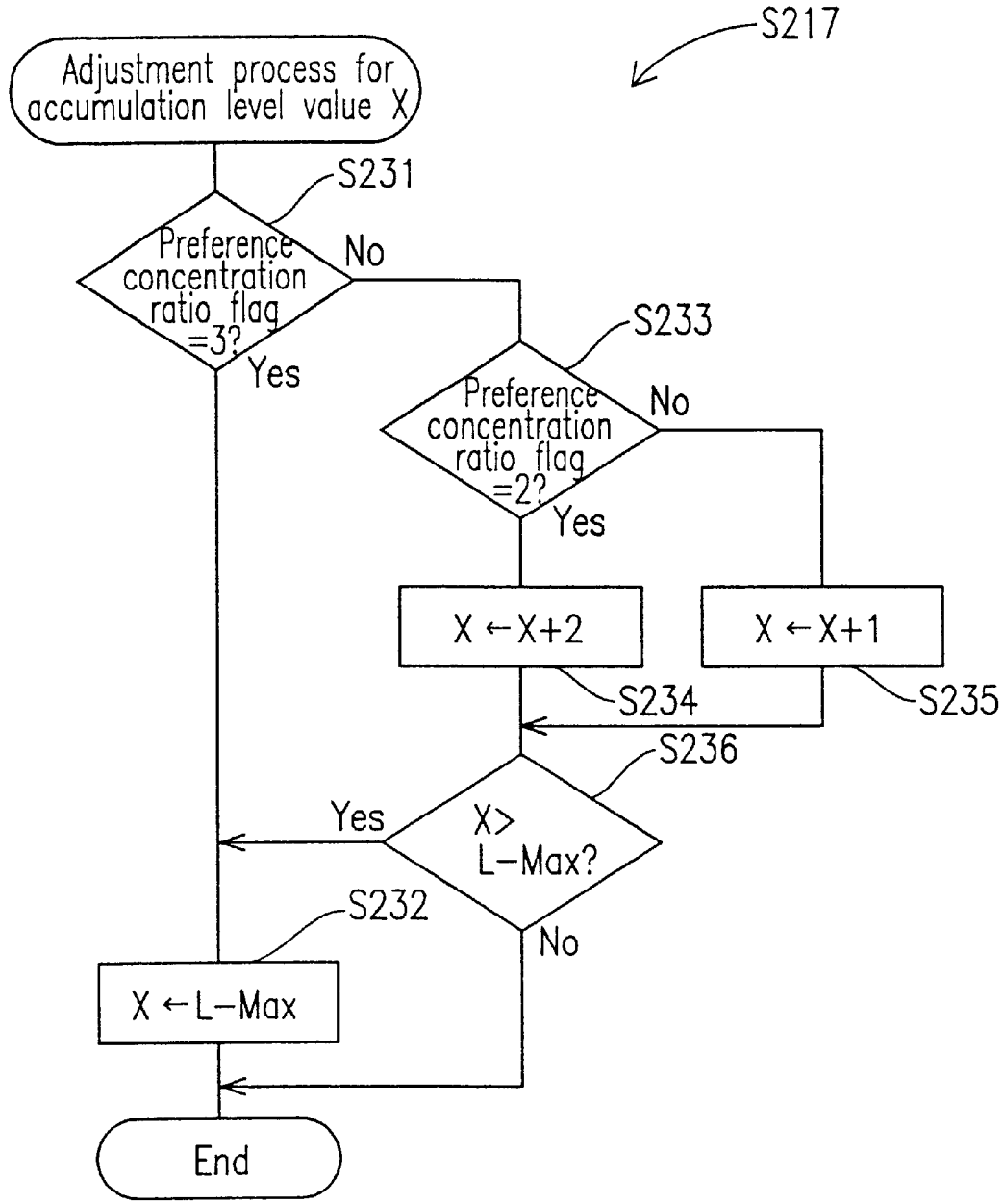
FIG. 17 is a flowchart illustrating a process for adjusting the accumulation level value X according to embodiment 3.
Figures 18, 19:
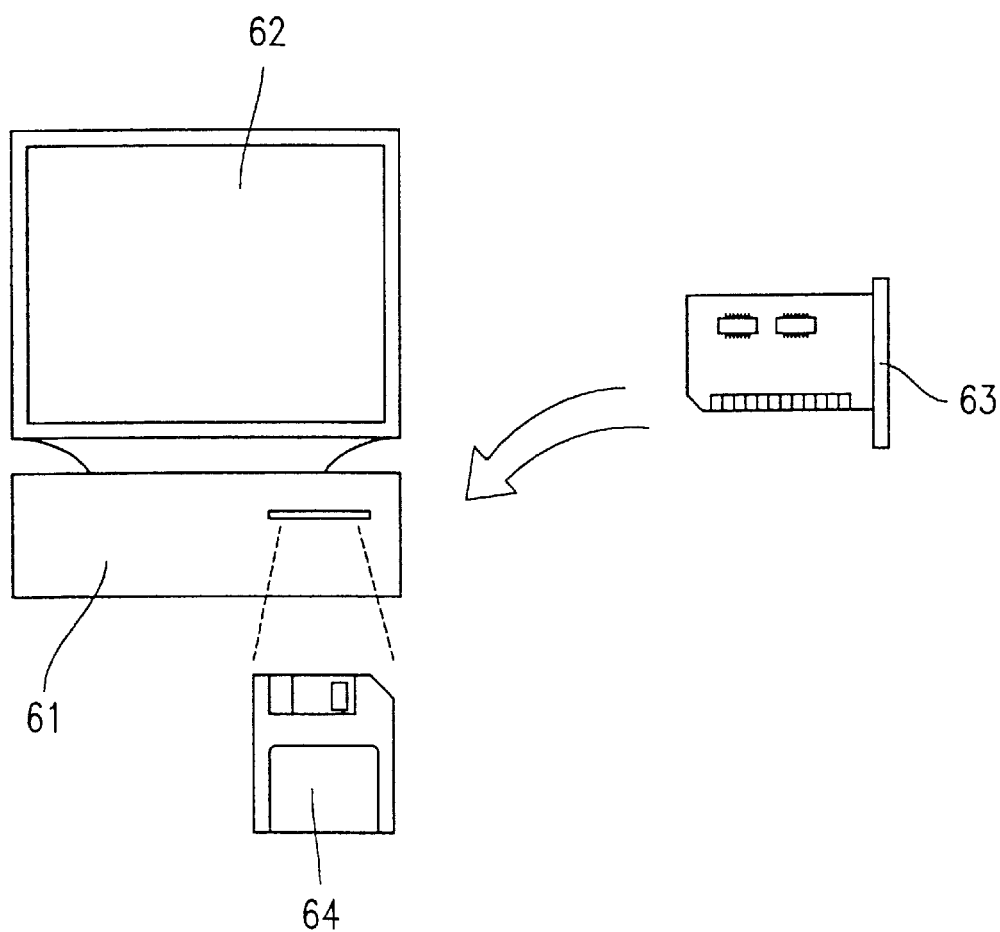
FIG. 18 shows a parameter table showing parameters of the accumulation data determining function according to embodiment 3.
FIG. 19 is an overview of the present invention embodied using a personal computer (PC).

The process that in the receiving device 1B, the accumulation level determining section 12 determines the accumulation level by providing parameters including the preference concentration ratio flag 47 to the accumulation data determining function, is described with reference to flow charts shown in FIGS. 16 and 17 in conjunction with FIG. 9. In embodiment 3, the parameters supplied by the accumulation level determining section 12 to the accumulation data determining function are shown in FIG. 18.

Roughly speaking, the transmitting device 2 transmits data having a structure as shown in FIGS. 7 and 8B, and the receiving device 1B receives the data at the receiving section 10 and stores the received data in the accumulative storage section 14.

On the other hand, user information as shown in FIG. 15 is previously contained in the user information storage section 16. This user information includes the preference concentration ratio flag 47 which represents the degree of concentration of the user's hobbies, interests, and preference shown in the user information.

Specifically, after the receipt of data at the receiving section 10, the accumulation level determining section 12 receives the data attribute data 30 (FIG. 8B) of the received data from the receiving section 10, and provides the keywords contained in the keyword data portion 30c of the data attribute data 30 to the user information acquiring section 17. The user information acquiring section 17 searches through the provided keywords for a keyword identical to any of the user preference items contained in the keyword data portion 45 of the user information (FIG. 15). Then, the user information acquiring section 17 supplies the preference concentration ratio flag 47 to the accumulation level determining section 12. In the case where a keyword identical to any of the user preference items contained in the user information is found, the user information acquiring section 17 also supplies the user information to the accumulation level determining section 12 along with the flag 47. In the example shown in FIGS. 8B and 15, "Beer" is a user preference item matched with a keyword.

The accumulation level determining section 12 receives, in addition to the user information including a user preference item which is identical to the keyword and the preference concentration ratio flag 47, the data attribute data from the receiving section 10, the date data from the date management section 17, and the free space capacity from the free space capacity acquiring section 19 as parameters for use in the accumulation data determining function. If the keyword data portion 45 of the user information does not include an user preference item identical to any of the keywords contained in the keyword data portion 30a of the data attribute data 30, only the preference concentration ratio flag 47 in the user information is provided as a parameter of the accumulation data determining function.

Figure 16:
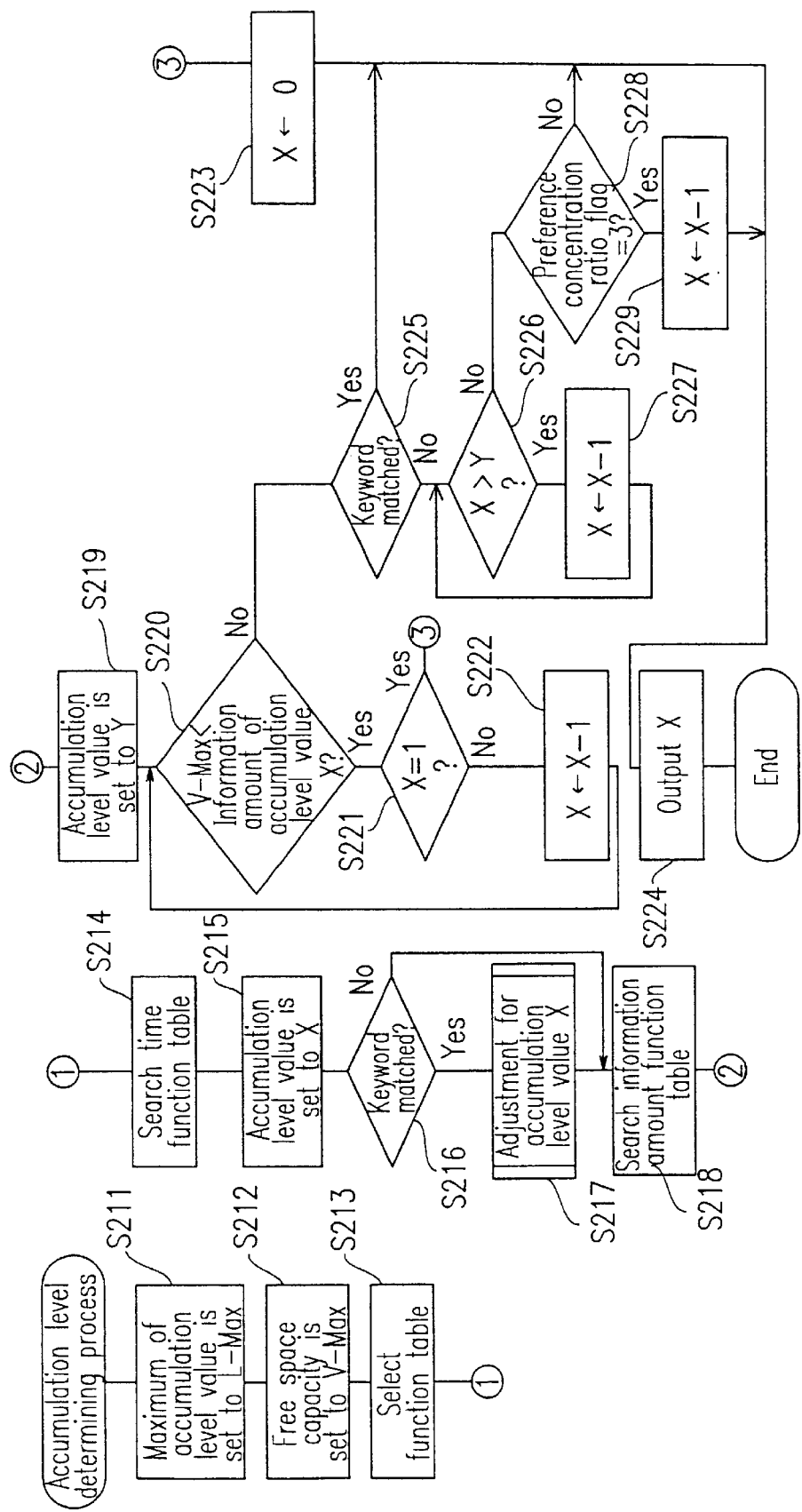
FIG. 16 is a flowchart illustrating a process through which an accumulation level determining section determines a portion of data (data item) of the received data to be accumulatively stored in an accumulative storage section according to embodiment 3.

As shown in FIG. 16, the accumulation level determining section 12 refers to the information amount data portion 30a of the data attribute data 30 (FIG. 8B) in order to obtain the maximum value of the accumulation level value of the received data (in the example shown in FIG. 8B, the accumulation level value "4" is selected among level 1 to level 4), and stores the obtained maximum value in a register L-Max of the accumulation level determining section 12 (S211). (Herein, the value stored in a register is represented by using the name of the register. In the example shown in FIG. 8B, L-Max=4.)

Next, the free space capacity received from the free space capacity acquiring section 19 is stored in a register L-Max as the largest capacity that represents the amount of data which can be accumulatively stored (S212).

The accumulation level determining section 12 obtains from the data attribute data 30 a classification data 30b "Catalog" and a keyword of the keyword data portion 30a "Beer". Furthermore, the accumulation level determining section 12 obtains the time function table (FIG. 10A) and the information amount function table (FIG. 10B) from the function storage section 11 (S213). The details of the time function table and the information amount function table are the same as those described in embodiment 2.

The accumulation level determining section 12 first searches the time function table based on the date in order to obtain a candidate value of the accumulation level (S214). Referring to the table shown in FIG. 18, the date parameter is "Nov. 23, 1999". As a result of searching the time function table (see FIG. 10A) with this date parameter, the accumulation level value which is set to November, "2", is selected as a candidate value of the accumulation level. This candidate value is stored in a register X of the accumulation level determining section 12 (S215).

As described above, in this example, the user information 46 includes a user preference item identical to one or more of the keywords contained in the data attribute data 30 ("Yes" at step S216). Accordingly, "adjustment to the accumulation level value X" is made based on the preference concentration ratio flag 47 (S217).

The "adjustment to the accumulation level value X" process at step S217 is described with reference to FIG. 17. In the case where the value of the preference concentration ratio flag 47 is "3" ("Yes" at step S231), it is recognized that "Beer" is one of a small number of user's interests. Then, the candidate value X of the accumulation level (in this example, "2" set to November) is increased to the maximum of the accumulation level value, L-Max, ("4" in this example) (S232). Alternatively, in the case where the value of the preference concentration ratio flag 47 is "2" ("Yes" at step S233), the candidate value X of the accumulation level is increased by 2 (S234). In the case where the value of the preference concentration ratio flag 47 is "1" ("No" at step S233), the candidate value X of the accumulation level is increased by 1 (S235). Furthermore, in the case where the candidate value X of the accumulation level is larger than the maximum value L-Max of the accumulation level value ("Yes" at step S236), the candidate value X is reduced to the maximum value L-Max of the accumulation level value, and the "adjustment to the accumulation level value X" process ends.

After the "adjustment to the accumulation level value X" process has ended, referring again to FIG. 16, the accumulation level determining section 12 then searches the information amount function table (FIG. 10B) based on the free space capacity to obtain an estimation value of the accumulation level in view of the free space capacity (S218). Referring to the parameter table of FIG. 18, the free space capacity parameter is "2 M(byte)". As a result of searching the information amount function table (FIG. 10B) with this parameter, the accumulation level value "3", which corresponds to "1 M or more and less than 5 M" of the information amount 38, is selected as a candidate value of the accumulation level. This candidate value is stored in a register Y of the accumulation level determining section 12 (S219).

Next, the comparison is made between the free space capacity of the accumulative storage section 14, V-Max, and the amount of data to be accumulatively stored when the accumulation level value is X (S220). Considering that the candidate value X of the accumulation level is "4" as a result of the adjustment at step S217, and referring to the accumulation level 4 of the information amount data portion 30a shown in FIG. 8B, the amount of data to be stored is "1 M (byte)". Referring to FIG. 18, the free space capacity of the accumulative storage section 14 is "2 M (byte)".

In the case where the amount of data to be stored when the accumulation level value is X is larger than the free space capacity V-Max ("Yes" at step S220), the data cannot be stored in the accumulative storage section 14. Thus, X is decremented until the amount of data to be stored when the accumulation level value is X becomes equal to the free space capacity V-Max (S222). However, in the process of decrementation, if the candidate value X of the accumulation level becomes "1" ("Yes" at step S221), the candidate value X is decreased to "0" (S223), and then the decreased value X ("0") is output as the accumulation level value (S224).

Alternatively, as in the example, shown in FIGS. 18 and 8B, the free space capacity V-Max ("2 M (byte)") is equal to or larger than the amount of data (1 M (byte)) to be stored when the accumulation level value is 4 ("No" at step S220), the presence of a match between keywords and user preference items is confirmed (S225).

In the case where a match between keywords and user preference items ("Beer") is found as in the example shown in FIGS. 15 and 8B ("Yes" in step S225), the candidate value X of the accumulation level is output as the accumulation level value even if the candidate value X ("4") is larger than the estimation value Y ("3") of the accumulation level (S224).

In the case where no match is found between keywords and user preference items ("No" at step S225), the comparison is made between the candidate value X of the accumulation level and the estimation value Y of the accumulation level. If the candidate value X is larger than the estimation value Y ("Yes" at step S226), the candidate value X is decremented until the candidate value X becomes equal to the estimation value Y (S227).

In the case where the candidate value X of the accumulation level is equal to or smaller than the estimation value Y of the accumulation level ("No" at step S226), the value of the preference concentration ratio flag 47 is checked. In the case where the value of the preference concentration ratio flag 47 is not "3" ("No" at step S228), the value X is output as the accumulation level value (S224).

In the case where the value of the preference concentration ratio flag 47 is "3" ("Yes" at step S228), the candidate value X of the accumulation level is larger than the estimation value Y of the accumulation level, although the user's hobbies, interests, and preference are concentrated in specific subjects, and the information contained in the received data ("Beer") is not important (no matching of keywords). In such a case, the candidate value X is decremented at step S229, and is output as the accumulation level value (S224).

According to the process described hereinabove, the accumulation level determining section 12 obtains the accumulation level value and supplies it to the data extraction section 13. The process from the step of supplying the value of the accumulation level to the data extraction section 13 to the step of accumulatively storing the data extracted from the received data in the accumulative storage section 14 is the same as that described in embodiment 2 with reference to the flow chart of FIG. 11.

According to the receiving device 1B having the above structure, in determining a portion (data item) of data to be accumulatively stored in the accumulative storage section 14 (accumulation level), the preference concentration ratio flag 47 which represents whether there is a specific tendency in the user's hobbies, interests, preferences, etc., is used. Therefore, in the adjustment of the accumulation level (increasing/decreasing adjustment) based on the user information, the user's characteristics can be reflected in the adjustment more strongly. Thus, in the accumulative storage of data, the degree of the user's satisfaction may be increased.

Embodiments of the present invention are not limited to the embodiments herein disclosed, and various modifications can be made thereto. For example, the above disclosed embodiments showed the three combinations of the parameters that the accumulation level determining section 12 provides to the accumulation data determining function when the accumulation level is determined: "free space capacity and data attribute", "free space capacity, data attribute, date, and user information (not including the preference concentration ratio flag 47)", and "free space capacity, data attribute, date, and user information (including the preference concentration ratio flag 47)". However, other combinations of the parameters can be employed. For example, "date and data attribute" may be used as the combination of parameters.

In embodiments 2 and 3, data items included in received data (title data, text data, sound data, and video data) are accumulatively stored in the form of the following combinations as shown in FIG. 7: "title data 31 (accumulation level 1)", "title data 31 and text data 32 (accumulation level 2)", "title data 31, text data 32, and sound data 33 (accumulation level 3)", and "title data 31, text data 32, sound data 33, and video data 34 (accumulation level 4)". However, it may be determined for each of the data items whether or not the data item is accumulatively stored. Especially in this case, the user information may include still other information that represents which of the text data, the sound data, and the video data the user prefers as a medium for transmission of information.

Furthermore, the classification data may include a plurality of data so that a more accurate accumulation data determining function can be selected based on a plurality of classification data.

In each of the above embodiments, there are provided single user information and a single accumulative storage section 14. However, a plurality of user information corresponding to a plurality of users may be identified by respective user identifiers 40 (FIG. 6 and FIG. 15), and may be accumulatively stored in the accumulative storage sections provided for respective users.

In the above embodiments, the free space capacity used as a parameter is a free space capacity of the accumulative storage section 14 at the time when the receiving device receives data. However, in the case where a plurality of data are received, the free space capacity used as a parameter may be updated each time an extracted data is accumulatively stored in the accumulative storage section 14.

Furthermore, the method for adjusting the candidate value of the accumulation level using the user information and the value of the preference concentration ratio flag 47 may be modified into various forms. For example, the candidate value of the accumulation level may be adjusted for each class of received data (see FIG. 8; the classification data 30b of the data attribute data 30).

In the embodiments herein disclosed, the function tables which serve as an accumulation data determining function have been previously stored in the function storage section 11 before the reception of data. However, the present invention may be embodied such that: various function tables are stored in a storage provided to a transmitting device; a function table(s) is transmitted to the receiving device alone or together with data from the storage medium of the transmitting device; and the function table(s) received by the receiving device is stored in the function storage section 11.

Furthermore, in the above embodiments of the present invention, how to set the items of user information was not described. However, it is preferable that a user can change the user information at her/his own discretion.

Still further, the above embodiments of the present invention suggest a perfect match between keywords contained in the keyword data portion 30c included in the data attribute data 30 of the received data and user preference items contained in the keyword data portion 45 of the user information. However, even in the case where the data attribute data 30 contains a keyword "Beer" and the user information contains an item "Drink" which is a broader term of "Beer", it may be considered that there is a match therebetween.

Still further, the functions of the receiving devices according to embodiments 1–3 of the present invention may be realized by a computer program, and this computer program may be stored in a computer-readable recording medium. FIG. 19 shows an example in which the present invention is embodied such that a storage medium containing a program that realizes the functions of the receiving device of embodiments 1–3 is used with a personal computer (PC). This embodiment uses a receiving device including a PC 61 or a receiving device including a PC 61 and a monitor 62 connected thereto, and an extension board 63 for receiving data is attached to the PC 61. The computer program that carries out the functions of the receiving device of embodiments 1–3 is read out into, e.g., a floppy disk 64 that serves as a storage medium, and the PC 61 and the extension board 63 are controlled by this computer program, so that the PC 61 functions as a receiving device.

Still further, the accumulation level determining section 12 may supply only the free space capacity of the accumulation storage section 14 as a parameter to the accumulation data determining function for determining which portion (which data item) of the received data is to be stored in the accumulative storage section 14. In this case, for example, reference information as shown in FIG. 20, which is used as a reference for measuring information amount with respect to each data item of the received data, is provided from any other section (not shown), while the accumulation level determining section 12 supplies the free space capacity to the accumulation data determining function, so that data items to be accumulatively stored in the accumulative storage section 14 are determined so that the information amount of stored data item is equal to an information amount specified in the accumulative storage section 14. Specifically, in the case where the free space capacity of the accumulative storage section 14 is "3 M bytes", three data items, "title data", "text data", and "sound data", are accumulatively stored; and in the case where the free space capacity of the accumulative storage section 14 is "100 K bytes", two data items, "title data" and "text data", are accumulatively stored.

As described hereinabove, according to the receiving device of the present invention which extracts a portion or the entirety of a received data (i.e., one, some, or all of the data items included in the received data) and accumulatively stores it in a storage medium, a portion to be extracted from the received data is determined based on the capacity of the free space of the storage medium. Therefore, undesirable cases can be avoided, for example, a case where storage of data fails due to a lack of sufficient capacity for storing necessary information for a user, or a case where necessary portions of the data cannot be completely stored even in the presence of sufficient free space capacity. Thus, the capacity of the storage section can be efficiently utilized.

Furthermore, in determining a data portion which is to be extracted from the received data for storage in the accumulative storage section, information specific to a user including hobbies, interests, preferences, etc., is considered. Therefore, a large amount of information associated with data necessary for the user is stored, while the reduced amount of information associated with data not especially necessary for the user is stored. Thus, the accumulative storage section 14 is efficiently utilized while increasing the degree of the user's satisfaction.

Still further, in determining a data portion which is to be extracted from the received data for storage in the accumulative storage section, a date of the day when the data was received is considered. Therefore, by considering both a content of the received data and the season or the time of the year which is represented by the date, more detailed information can be stored for timely-provided data.

Still further, in determining a portion (data item) of the received data which is to be stored in the accumulative storage section, whether or not there is a specific tendency in the user's hobbies, interests, preferences, etc., can be reflected. Therefore, in adjusting the amount of data to be stored based on the user information, the user's characteristics can be more strongly reflected in the increasing/decreasing adjustment of the data amount. Thus, the data storage can be performed so that the degree of the user's satisfaction is further increased.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A receiving device, comprising:
a receiving section for receiving first data including a plurality of data items;
an accumulative storage section in which at least one of the plurality of data items is stored;
a free space capacity acquiring section for acquiring a free space capacity of the accumulative storage section;
an accumulation level determining section for determining an accumulation level representing a data item to be stored in the accumulative storage section and determining an accumulation level value representing the data amount to be stored in the accumulative storage section, wherein the accumulation level is attached to the data item;
a data extraction section for extracting a data item from the first data based on the accumulation level value from the accumulation level determining sections; and a data writing section for writing the data item extracted by the data extraction section in the accumulative storage section, wherein the accumulation level determining section includes a function storage section for storing a function for determining the data item to be extracted from the first data based on predetermined parameters, and the parameters include at least the free space capacity, and the accumulation level determining section determines the accumulation level based on the function in the function storage section such that data is accumulatively stored in the accumulative storage section."

2. A receiving device according to claim 1, wherein:

the first data includes a data attribute, and the parameters further include the data attribute.

3. A receiving device according to claim 1, further includes:

a user information storage section for storing information associated with a user as user information; and a user information acquiring section for acquiring the user information from the user information storage section, wherein the parameters include the user information.

4. A receiving device according to claim 3, wherein the user information includes a preference concentration ratio flag representing whether or not a user's preference is concentrated in a specific field.

5. A receiving section for receiving first data including a plurality of data items;

an accumulative storage section in which at least one of the plurality of data items is stored;

a date management section for managing a date;

an accumulation level determining section for determining an accumulation level representing a data item to be stored in the accumulative storage section and determining an accumulation level value representing the data amount to be stored in the accumulative storage section, wherein the accumulation level is attached to the data item;

a data extraction section for extracting the data item from the first data based on the accumulation level value from the accumulation level determining section; and a data writing section for writing the data item extracted by the data extraction section in the accumulative storage section, wherein the accumulation level determining section includes a function storage section for storing a function for determining the data item to be extracted from the first data based on predetermined parameters, the plurality of data items each include a data attribute, and the parameters include at least the data attribute and the date, and the accumulation level determining section determines the accumulation level based on the function in the function storage section such that data is accumulatively stored in the accumulative storage section."

6. A receiving device according to claim 5, further includes a free space capacity acquiring section for obtaining a free space capacity of the accumulative storage section, wherein the parameters further include at least the free space capacity.

7. A receiving device according to claim 6, further comprising:

a user information storage section for storing information associated with a user as user information; and a user information acquiring section for acquiring the user information from the user information storage section, wherein the parameters further include the user information.

8. A receiving device according to claim 7, wherein the user information includes a preference concentration ration flag representing whether or not a user's preference is concentrated in a specific field.

* * * * *